(12) United States Patent
Nakada

(10) Patent No.: US 7,020,116 B1
(45) Date of Patent: Mar. 28, 2006

(54) METHOD AND APPARATUS OF DATA TRANSMISSION

(75) Inventor: Tatsuhiro Nakada, Kodaira (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 992 days.

(21) Appl. No.: 09/672,880

(22) Filed: Sep. 29, 2000

(30) Foreign Application Priority Data

Sep. 30, 1999 (JP) .......................................... 11-278135

(51) Int. Cl.
*H04Q 7/24* (2006.01)

(52) U.S. Cl. ...................................... 370/338; 375/343

(58) Field of Classification Search ................. 370/338, 370/252, 254, 349, 208, 206, 207, 491, 357, 370/480–484, 350; 455/456; 375/343, 260–267, 375/316, 243, 244, 210, 222, 298, 376, 355, 375/219, 341

See application file for complete search history.

(56) References Cited

U.S. PATENT DOCUMENTS

| | | | | |
|---|---|---|---|---|
| 5,774,450 A | * | 6/1998 | Harada et al. ............... | 370/206 |
| 5,991,289 A | * | 11/1999 | Huang et al. ................ | 370/350 |
| 6,122,246 A | * | 9/2000 | Marchok et al. ............ | 370/208 |
| 6,246,735 B1 | * | 6/2001 | Sano et al. .................. | 375/364 |
| 6,304,611 B1 | * | 10/2001 | Miyashita et al. ........... | 375/260 |
| 6,459,679 B1 | * | 10/2002 | Kim ............................ | 370/208 |
| 6,493,395 B1 | * | 12/2002 | Isaksson et al. ............. | 375/261 |
| 6,539,063 B1 | * | 3/2003 | Peyla et al. .................. | 375/267 |
| 6,546,055 B1 | * | 4/2003 | Schmidl et al. .............. | 375/244 |
| 6,687,315 B1 | * | 2/2004 | Keevill et al. ............... | 375/341 |
| 6,700,866 B1 | * | 3/2004 | Heinonen et al. ............ | 370/208 |

FOREIGN PATENT DOCUMENTS

| | | |
|---|---|---|
| EP | 0318685 | 6/1989 |
| EP | 0689313 | 12/1995 |
| EP | 0896457 | 2/1999 |
| JP | A-7-321762 | 12/1995 |
| WO | 9707620 | 2/1997 |

\* cited by examiner

*Primary Examiner*—Chi Pham
*Assistant Examiner*—Prenell Jones
(74) *Attorney, Agent, or Firm*—Mattingly, Stanger, Malur & Brundidge, P.C.

(57) ABSTRACT

A data transmission apparatus employing an orthogonal frequency division multiplex system. A receiver included therein analyzes a cross-correlation value sequence signal (CT) which has been acquired from the arithmetic operation of the correlation between a received signal and a predetermined symbol signal to detect an effective correlation peak in which the inter-symbol interference becomes minimum, and on the basis of the effective correlation peak thus detected, carries out the processing of synchronizing a reception sampling clock, and the control for the frame timing and the symbol timing of the receiver.

13 Claims, 18 Drawing Sheets

METHOD AND APPARATUS OF DATA TRANSMISSION

CROSS-REFERENCES TO RELATED APPLICATIONS

The present invention relates to the following U.S. Patent application assigned to the assignee of the present invention. U.S. Ser. No. 09/099390, Atushi Miyasita et al. filed on Jun. 18, 1998 entitled "OFDM MODULATOR AND OFDM MODULATION METHOD FOR DIGITAL MODULATED WAVE HAVING GUARD INTERVAL", U.S. Ser. No. 09/096454, Seiichi Sano et al. filed on Jun. 11, 1998 entitled "DATA TRANSMISSION APPARATUS AND RECEIVING APPARATUS USING ORTHOGONAL FREQUENCY DIVISION MULTIPLEX MODULATION SYSTEM" and U.S. Ser. No. 09/203564, Seiichi Sano et al. filed on Dec. 2, 1998 entitled "SYNCHRONIZATION DETECTION METHOD FOR DATA TRANSMISSION APPARATUS AND DATA TRANSMISSION APPARATUS USING THE SAME".

BACKGROUND OF THE INVENTION

The present invention relates in general to a method and an apparatus for transmitting data, and more particularly to a method and an apparatus for transmitting data employing an OFDM (Orthogonal Frequency Division Multiplex) system, and a method and an apparatus for receiving an OFDM signal.

In recent years, as for the modulation method which is suitable for being applied to the digital audio broadcasting for mobiles and terrestrial digital television broadcasting, the OFDM system which features a robustness to multi path fading and ghost has received much attention. The OFDM system is one of the multi-carrier modulation systems and is a transmission method of subjecting n carriers (n is in the range of several tens to several hundreds) which are authogonal to one another.

Then, as shown in FIG. 2, the modulated signal is transmitted which is acquired by adding a large number of digital modulated waves to one another and by subjecting the I-axis and the Q-axis to the orthogonal modulation. While as for the above-mentioned digital modulation method, in general, the 4 DQPSK (4 Differential Quadrature Phase Shift Keying) system is often employed, it is also possible to employ the multi-value modulation system such as the 16 QAM (16 Quadrature Amplitude Modulation) or the 32 QAM.

In addition, as shown in FIG. 3, the symbol of the OFDM is constructed such that the guard interval for reducing the influence of the delayed wave is added to the effective data symbol. The guard interval is the signal which is added cyclically to the signal of the effective data symbol. The guard interval is described in, for example, U.S. Ser. No. 09/099390 (corresponding to European Patent application No. 98111075.2 filed on Jun. 17, 1998) entitled "OFDM MODULATOR AND OFDM MODULATION METHOD FOR DIGITAL MODULATED WAVE HAVING GUARD INTERVAL", the disclosure of which is hereby incorporated herein by reference. By adding the guard interval, degradation due to the inter-symbol interference thereof can be avoided against the delayed wave generated due to the delay time within the guard, and hence the OFDM system is robust to multi path fading.

On the other hand, since in the OFDM system, the frequency interval between the carriers is narrow, interference between the carriers due to the carrier frequency error between the transmitter and the receiver and due to the sampling clock frequency error of the demodulation system may readily occur, and hence high accuracy is required for those frequencies.

For this reason, in order that the receiver may continue to receive properly the OFDM signal, there is required the processing of recovering the sampling clock with which the sampling clock frequency of the receiver is made coincide with the sampling clock frequency of the transmission signal. In addition, in the case where the frame period and the symbol period of the received signal fluctuate with time, the sampling clock frequency of the receiver needs to follow that fluctuation.

For this reason, the transmission side transmits the OFDM transmission signal in which the transmission frame is constituted by the effective data symbol and the several kinds of synchronous symbol groups. An example of the constitution of the transmission frame is shown in FIG. 4.

The reception side executes the sync pull-in processing on the basis of the synchronous symbol. Then, the sampling clock frequency on the transmission side is synchronized with the sampling clock frequency on the reception side to demodulate the OFDM signal.

In this connection, a prior art technique relating to sync pull-in based on the synchronous symbol or the like is disclosed in JP-A-7-321762 for example.

SUMMARY OF THE INVENTION

First, description will hereinbelow be given with respect to an example of a configuration of an OFDM digital transmission apparatus to which the present invention is applied and the operation thereof.

FIG. 5 is a block diagram showing a configuration of a transmitter for transmitting therefrom the above-mentioned transmission frame. The configuration and operation of this transmitter will now be described with reference to FIGS. 5 and 4, respectively.

As shown in FIG. 4, a first symbol is a null signal synchronous symbol (hereinafter, referred to as "a null symbol" for short, when applicable) and is generated in a null symbol generator 54. The null symbol is zero on I and Q axes with respect to the amplitude thereof, and hence the null symbol is the symbol for detecting roughly a specific position on the time base.

A second symbol is a symbol in which the amplitude is fixed, and the frequency thereof is changed at fixed rate with time from the lower frequency to the upper frequency within the transmission band over the symbol period of time (hereinafter, referred to as "a sweep symbol" for short, when applicable) and is generated in a sweep symbol generator 55. The auto-correlation function of this sweep symbol has a sharp peak value, and hence by utilizing this property, it is possible to acquire a specific time point on the time base with higher accuracy than that of the null symbol.

The symbols on and after a third symbol are constituted by data symbols with which the effective data is transmitted, and the data symbols of several tens to several hundreds of symbols are continuous therein. The data symbol is used to subject the data mapped in a constellation mapping unit 51 to the IFFT (Inverse Fast Fourie Transform) arithmetic operation in an IFFT arithmetic operation unit 52 to convert the resultant data into a time base signal.

In a guard interval addition unit 53, the guard interval is added to the signal from the IFFT arithmetic operation unit 52 to generate a data symbol of the OFDM signal.

The transmission frame is constituted by the synchronous symbol and the data symbols, and a base band OFDM signal in a frame construction is outputted from a selector 56.

After being inputted to a D/A conversion unit 57 for digital/analog conversion therein, the OFDM signal is up-converted into the signal having an IF (Inter Frequency) band in a base band (BB)/IF conversion unit 58. Then, the OFDM transmission signal is transmitted in transmission frames.

FIG. 6 is a block diagram showing a configuration of a receiver for receiving the above-mentioned OFDM signal.

In the receiver shown in FIG. 6, after the received signal is converted into the signal having the IF band width, the signal having the IF band width is converted into the signal having the frequency band of the base band in an IF/BB conversion unit 61 to acquire the base band OFDM signal. Then, the base band OFDM signal is sampled using the sampling clock from a VCO 67 in an A/D conversion unit 62 to acquire the signal of the reception sample value sequence.

Next, description will hereinbelow be given with respect to the reception side sampling clock recovery processing wherein the sampling clock frequency when carrying out the sampling in the A/D conversion unit 62 is made coincide with the sampling clock frequency of the transmission signal, and a series of processing wherein the transition points of the frame and the symbol of the reception sample value sequence signal are detected to control the timing of the frame and the symbol period of time in the receiver with reference to FIG. 8.

FIG. 8 is a time chart for explaining the operation of a frame counter 68.

The above-mentioned frame timing and symbol timing are counted in reception sampling clocks at an RES terminal of the frame counter 68.

First, as a first stage, a null symbol detection unit 63 detects a starting point of the null symbol from the reception sample value sequence signal sent from the A/D conversion unit 62 to output a signal NS exhibiting the rough starting point of the transmission frame. The signal NS is inputted to the frame counter 68 and resets the count value of the frame counter 68 at a time TC1.

The frame counter 68 continues to carry out the counting in reception sampling clocks to determine roughly the timing of the current frame and symbol.

In a second stage, since the information relating to the starting point of the frame detected by the null symbol detection unit 63 contains an error, the specific time point on the time base of the transmission frame is more accurately detected. For this reason, a time window having a predetermined length is provided on the time base on the basis of the null symbol starting position acquired in the first stage. That is, this time window is initially provided a predetermined distance away from the null starting position on the time base. In general, the length of the time window has a length containing therein the sweep symbol signal.

A sweep symbol correlation arithmetic operation unit 64 carries out the arithmetic operation of the cross-correlation between the received sample value sequence contained in that time window and the sweep symbol signal, which is previously stored, every position of the time window while moving successively the time window from the initially set position on the time base to operate arithmetically a cross-correlation value sequence signal. In this connection, the time window is moved by about more than ten samples before and after the sweep symbol in such a way as to contain at least the sweep symbol period of time of the received signal.

Since the sweep symbol is such that the auto-correlation function has a sharp peak value, when the received sweep symbol coincides with the sweep symbol previously stored, the correlation value becomes a large value, while when the received sweep symbol is shifted therefrom on the time base, the correlation value becomes almost zero. The cross-correlation value sequence which is acquired when moving the time window in this way is as shown in FIG. 7.

Next, a correlation maximum position detection unit 65 detects the maximum value from the cross-correlation value sequence. The correlation maximum value becomes maximum when the position of the time base coincides with the position of the sweet symbol in the received signal.

Then, the correlation maximum position detection unit 65 operates arithmetically in reception sampling clocks an error on the time base between the position of the time window when outputting the correlation maximum value and a time point of the sweep symbol which is counted on the basis of the null symbol starting position which has been detected in the first stage to output error information ERR.

Since the correlation maximum value position detection unit 65 can detect the sweep symbol position in the reception sample value sequence with high accuracy, the detection unit 65 inputs the error information ERR acquired in the correlation maximum value position detection unit 65 to an LD terminal of the frame counter 68 at a time TC3 to correct the count value. With respect to the correction of the count value, for example, the count value at a time point TC3 is corrected back and forth by the value of the error information ERR, whereby the frame timing of the reception sample value sequence at a starting time point (TC4) of a next frame coincides with the frame timing of the frame counter 68.

In addition, that error information ERR is a value acquired by counting in reception sampling clocks an error in time between one frame period of time counted using the sampling clock on the transmission side and one frame period of time counted using the reception sampling clock, and is converted into the frequency error of the received sampling clock.

For this reason, a VCO control unit 66 outputs a signal which is used to control variably the output clock frequency of a VCO 67 on the basis of the error information ERR from the correlation maximum value position detection unit 65. Then, the VCO 67 outputs the sampling clock variably controlled on the basis of the frequency control signal from the VCO control unit 66.

This frequency control is carried out an and after the third frame similarly thereto, whereby the sampling clock with which the received OFDM signal is sampled can be synchronized with the clock on the transmission side at all times.

In addition, after the frequency control for the reception sampling clock has been roughly stabilized as in a fourth frame of FIG. 8, in the case where the value of the reception sampling error information ERR falls within a predetermined range (within ±1 for example) in such a way that a slight error of the reception sampling clock frequency does not reflect the count value of the frame counter 68, the correction for the count value is not carried out at all. This reason is that since the control for the reception sampling clock frequency is carried out in samples, the error of the reception sampling clock frequency can not be controlled within ±1 clock in one frame.

By executing the above-mentioned processing, since the reception sample value sequence is synchronized with the count value of the frame counter 68, it is possible to be accurately aware of a specific time point such as a transmission point of the frame or the symbol on the reception sample value sequence.

Next, description will hereinbelow be given with respect to the processing of regenerating the reception sampling clock, and demodulation processing after the control for the frame timing and the symbol timing has been established with reference to FIG. 6 and FIGS. 9 to 11.

FIG. 9 is a diagram showing the relation between the FFT time window of the FFT arithmetic operation unit 69 and the symbol, FIG. 10 is a diagram showing a relation between a principle wave and a reflected wave when the delay time of the reflected wave is shorter than the guard interval, and FIG. 11 is a diagram showing the relation between the principle wave and the reflected wave when the delay time of the reflected wave is longer than the guard interval. In this connection, in FIGS. 10 and 11, the height of the rectangle showing the principle wave for one symbol period and the height of the rectangle showing the reflected wave for one symbol period represent schematically the relation between the reception intensity of the principle wave and that of the reflected wave. That is, in each of FIGS. 10 and 11, since the height of the rectangle of the principle wave is higher than that of the rectangle of the reflected wave, it is shown that the reception intensity of the principle wave is larger than that of the reflected wave.

In FIG. 6, first, the reception sample value sequence signal from the A/D conversion unit 62 is inputted to an FFT (Fast Fourie Transform) arithmetic operation unit 69.

Since the timing when the reception sample value sequence signal is inputted to the FFT arithmetic operation unit 69, i.e., the time window of the FFT utilizes generally the guard interval effectively, as shown in FIG. 9, it is the timing when the reception sample value sequence of the backward period of time (the effective data symbol unit) of the symbol is inputted, i.e., the time window thereof.

Now, since the OFDM modulated signal has the guard interval, as shown in FIG. 10, even if the reflected wave generated due to the presence of a mountain or building is inputted, the longitudinal symbol is not mixed therewith at all as long as the delay time falls within the guard interval period of time.

However, as shown in FIG. 11, in the case where there is present the reflected wave having the delay time which is longer than the guard interval period of time, the front symbol is mixed therewith so that the inter-symbol interference is generated.

In other words, since the inter-symbol interference in the OFDM signal is regarded as a mixing of Gaussian random noise, as a result, it appears in the form of the degradation of a C/N (Carrier/Noise) ratio so that the code error rate is degraded.

Now, the data (reception sample value sequence signal) inputted to the FFT arithmetic operation unit 69 is subjected to Fast Fourie Transform for conversion from the time base signal to the frequency base signal.

Then, a demodulation processing unit 6A demodulates the data, which has been converted into the frequency base signal in the FFT arithmetic operation unit 69, on the basis of the demodulation method corresponding to the modulation method every carrier to output the demodulation result.

By executing the above-mentioned processing, it is possible to carry out the digital signal transmission employing the OFDM modulation method.

Let us consider the transmission under the condition of the transmission path of very poor quality such as in the mobile transmission in the case where the transmission is carried out using the transmitter and the receiver according to the above-mentioned prior art.

Since in such a transmission path, the principle wave which is directly propagated from the transmitter to the receiver, and the various kinds of reflected waves which have been reflected by buildings, mountains or the like are propagated with the respective predetermined delay times brought, the composite wave thereof is received at the receiver.

In addition, in the mobile transmission, the delay times or the levels of such reflected waves fluctuate every movement and further the principle wave is blocked by a building or the like so that the level of the principle wave may become small and hence each of the levels of the reflected waves may be larger than than of the principle wave.

On the other hand, in the fixed line transmission, since in general, line-of-sight locations from the transmitter to the receiver is selected in order to carry out the line design, the principle wave having a high level is stably present and hence it is rare that the transmission line condition becomes as poor as that of the mobile transmission.

However, in the case of the SFN (Single Frequency Network) method wherein transit transmission is carried out using the same frequency in a plurality of switching offices, the composite wave of the two signals each having a high level due to the propagation delay time difference in the propagation will be received in the vicinity of the intermediate point between one switching office and another switching office.

In this case, the signal which has reached formerly the receiver can be regarded as the principle wave, while the signal which has reached lately the receiver can be regarded as the reflected wave.

Examples of the arithmetic operation of the value of the cross-correlation between the sweep symbol signal which is received when the principle wave is mixed with such a reflected wave and the sweep symbol signal which is previously stored in the receiver are shown in FIGS. 12 and 13, respectively.

FIG. 12 shows the case of the transmission path condition in which both of the principle wave having a high level, and the reflected wave which has a level lower than that of the principle wave, but which brings a certain delay time are present. If the principle wave is mixed with such a reflected wave, then the peaks which correspond to the levels and the delay times of the principle wave and the reflected wave are respectively generated in the cross-correlation value sequence of the receiver, respectively. In FIG. 12, the correlation peak brought by the principle wave is present at the center of the graph and the correlation peak brought by the reflected wave is present on the right-hand side thereof.

The correlation maximum value position detection unit 65 of the receiver detects the maximum value out of the cross-correlation value sequence as shown in FIG. 12.

In this case, since the correlation maximum value brought by the principle wave is present at the center of the graph, the correlation maximum value position detection unit 65 detects the correlation peak brought by the principle wave as the maximum value, and on the basis thereof, carries out the reception sampling clock synchronous processing, and the control for the frame timing and the symbol timing.

FIG. 10 shows a schematic view of the received signal at this time. Also, FIG. 10 shows the state in which the delay time of the reflected wave is shorter than the guard interval period of time.

In this case, since the correlation maximum value is brought by the principle wave having a high level, the time window of the FFT arithmetic operation unit 69 is determined on the basis of the timing of the principle wave. Therefore, the principle wave is not mixed with the longitudinal symbol at all and hence no inter-symbol interface is generated.

On the other hand, FIG. 13 shows an example in the case of the transmission path condition in which both of the principle wave, and the reflected wave having a level higher than that of the principle wave and also having a delay time shorter than the guard interval length are present. The correlation peak brought by the principle wave is present at the center of the graph of FIG. 13, and also the correlation peak brought by the reflected wave having a higher level than that of the principle wave is shown on the right-hand side of the graph.

In such a case, since as shown in FIG. 13, in the cross-correlation value sequence, the correlation peak brought by the reflected wave on the right-hand side of the graph is the maximum value, the correlation maximum value position detection unit 65 detects that correlation peak as the maximum value.

Accordingly, the control for the frame timing and the symbol timing is carried out on the basis of the correlation peak brought by that reflected wave.

The state of the received signal in this case is shown in FIG. 14. In this case, since the frame timing and the symbol timing provided by the frame counter 82, as described above, is controlled on the basis of the reflected wave, the time window of the FFT arithmetic operation unit 69 is also determined on the basis of the timing of the reflected wave.

Thus, since the FFT time window is synchronized with the reflected wave, in addition to the principle wave of the current symbol and the reflected wave thereof, a part of the principle wave of a next symbol is composed into the reception sample value sequence signal which is in turn inputted to the FFT arithmetic operation unit 69, and hence the inter-symbol interference will occur. In other words, since the principle wave of the current symbol is mixed with the principle wave of the next symbol in the form of noise, as a result, the degradation of the C/N ratio is caused to degrade the code error rate.

Showing an example of this degradation of the C/N ratio, in the case where the effective symbol length is 51.2 μsec, and also the principle wave of the control symbol is mixed with the reflected wave which has a level higher than that of the principle wave by 5 dB and which has a delay time of 1.5 μsec, there is given the disadvantage that the C/N ratio is degraded down to about 21 dB.

Next, FIG. 22 is a graphical representation showing the cross-correlation value sequence in the case of the transmission path condition in which both of the principle wave, and the reflected wave having a level higher than that of the principle wave and also having a delay time longer than the guard interval length, are present.

The correlation peak brought by the principle wave is present at the center of the graph, and the correlation peak brought by the reflected wave having a higher level than that of the principle wave is shown on the right-hand side of the graph.

In such a case, if the time window of the FFT arithmetic operation unit 69 is set in timing with the reflected wave, then the degree of the inter-symbol interference may become less in some cases.

An example in such a case will hereinbelow be described with reference to a schematic view of FIG. 23, and FIG. 24.

In the case where as shown in FIG. 23, the FFT time window is set on the basis of the timing of the principle wave, the reflected wave of the current symbol is mixed with the reflected wave of the preceding symbol beyond the guard interval to cause the inter-symbol interference. On the other hand, in the case where the FFT time window is set on the basis of the timing of the reflected wave, since the principle wave of the current symbol is mixed with the principle wave of the next symbol, similarly, the inter-symbol interference is caused.

In other words, while when the principle wave of the current symbol is mixed with the reflected wave having a longer delay time than the guard interval length, the inter-symbol interference is caused either in the case where the FFT time window is set on the basis of the timing of the principle wave or in the case where the FFT time window is set on the basis of the timing of the reflected wave, the degree of the inter-symbol interference thus caused differs depending on whether the current symbol is mixed with the reflected wave of the preceding symbol or the current symbol is mixed with the next symbol of the principle wave.

FIG. 24 is a diagram showing that, in order to obtain a less inter-symbol interference, the FET time window should be synchronized with which one of the principle wave or a reflected wave when the reflected wave has a longer delay time than the guard interval length.

Now, the axis of ordinate shown in FIG. 24 represents the D (Desired)/U (Undesired) ratio of the level of the principle wave to the level of the reflected wave in decibels, and the axis of abscissa represents the delay time of the reflected wave. In this connection, in this case, it is assumed that the effective symbol length of the OFDM data symbol is 51.2 μsec, and the guard interval length is 1.6 μsec.

In this figure, it is shown that in the area (white part) of the upper part of the graph, the inter-symbol interference becomes less when the FFT time window is provided in the timing of the principle wave, while in the area (oblique line part) of the lower part of the graph, the inter-symbol interference becomes less when the FFT time window is provided in the timing of the reflected wave. In addition, in the case where a level of the principle wave is higher than that of the reflected wave when the delay time is within the guard interval, as described above, the time window of the FFT is always provided in timing with the principle wave, whereby the inter-symbol interference is not caused at all.

Thus, when a reflected wave is present with the delay time longer than the guard interval length, the FET time window should be provided in timing with which one of the principal wave or the reflected wave for a less inter-symbol interference depends on the delay time and the level of the reflected wave.

Now, taking the operation in the mobile transmission into consideration, as described above, since the state of the transmission path is changing every moment, the cross-correlation value sequence is changed as shown in the examples of FIGS. 12 and 13. For example, the correlation peak brought by the principle wave becomes large in a certain frame, while the correlation peak brought by the reflected wave becomes large in the next frame, and so forth. Thus, the fluctuation of the correlation peak values of the principle wave and the reflected wave in the cross-correlation value sequence becomes violent.

As described above, since the correlation maximum value position detection unit 65 follows such a fluctuation of the cross-correlation value sequence, the position of the time window when detecting the maximum value changes depending on the state of the transmission path, and the value of the error information ERR will also change.

This is reflected to the VCO control unit 66, and as a result, the reception sampling clock frequency outputted from the VCO 67 is also changed so that the proper demodulation processing can not be carried out in the demodulation processing unit 6A.

In addition, since the fluctuation of the error information ERR brings the fluctuation of the count value of the frame counter 68, there arises a problem that both of the frame timing and the symbol timing also fluctuate.

In the light of the foregoing, the present invention is intended to solve the above-mentioned problems, and it is therefore an object of the present invention to provide an OFDM digital transmission method in which the inter-symbol interference is less and hence the C/N ratio is better and an apparatus employing the same, and a method and an apparatus for receiving an OFDM signal.

It is another object of the present invention to provide an OFDM digital transmission method by which the processing of synchronizing a reception sampling clock, and the control for the frame timing and the symbol timing can be suitably carried out, and an apparatus employing the same, and a method and an apparatus for receiving an OFDM signal.

It is still another object of the present invention to provide an OFDM digital transmission method by which even when a cross-correlation peak value fluctuates in the operation of a mobile transmission apparatus or the like which undergoes the fluctuating transmission path state, a reception sampling clock frequency can be synchronized with a transmission side sampling clock frequency to continue to supply stably a reception side sampling clock and an apparatus employing the same, and a method and an apparatus for receiving an OFDM signal.

In order to attain the above-mentioned objects of the present invention, an OFDM data transmission apparatus according to one aspect of the present invention includes a receiver which analyzes a cross-correlation value sequence signal acquired from an arithmetic operation between a received signal consisting of a principle wave, a reflected wave or a composite wave thereof and a predetermined synchronous symbol signal to detect, out of one or more correlation peaks brought by the principle wave and/or the reflected wave, an effective correlation peak in which the symbol interference becomes minimum to carry out a reception sampling clock synchronous processing and the control for the frame timing and the symbol timing of the receiver on the basis of the effective correlation peak thus detected.

According to one feature of the present invention, an effective correlation peak is detected in which a value of a correlation peak is equal to or larger than a predetermined value, and the inter-symbol interference becomes minimum and on the basis of the effective correlation peak thus detected, a control signal is generated in accordance with which the reception sampling clock synchronous processing and the control for the frame timing and the symbol timing of the receiver are carried out.

According to another feature of the present invention, if the above-mentioned effective correlation peak can not be detected, then the reception sampling clock synchronous processing and the control for the frame timing and the symbol timing of the receiver are suspended to hold the control state right before the suspension.

According to a further feature of the present invention, the control is carried out on the basis of the above-mentioned effective correlation peak in such a way that the reception sampling clock frequency is synchronized with the sampling clock on the transmission side.

More specifically, a receiver according to the present invention may operate such that an arithmetic operation of the cross-correlation between the received signal and a predetermined synchronous symbol is carried out to acquire a cross-correlation value sequence signal; and out of the cross-correlation value sequence signal thus acquired, a plurality of correlation peaks are detected which are derived by the principle wave or the reflected wave. Each of the magnitudes of the detected correlation peak values is compared with the magnitude of a predetermined value. Then, if each of the magnitudes of the detected one or more correlation peak values is larger than that of the predetermined value, then one of them which has less inter-symbol interference is judged to be the effective correlation peak, thereby detecting the correlation peak brought by the principle wave or the reflected wave having an electric power equal to or larger than a predetermined level.

Then, it is judged in timing with which of the principle wave or the reflected wave the FFT time window may be provided in order to specify the correlation peak for establishment of synchronization.

On the basis of the effective correlation peak for establishment of synchronization acquired from the above-mentioned processing, the the reception sampling clock synchronous processing and the control for the frame timing and the symbol timing of the receiver are carried out.

Now, if the level of the effective correlation peak for establishment of synchronization which has been stably present till now is reduced so that the correlation peak value becomes smaller than the predetermined value, then it is judged that the state of the transmission path is of very poor quality and as a result, the stable received signal has not yet reached the receiver. Then, the reception sampling clock synchronous processing and the control for the frame timing and the symbol timing of the receiver are suspended to carry out the demodulation while holding the control state obtained when the reception was stably carried out.

In such a manner, the reception sampling clock synchronous processing and the control for the frame timing and the symbol timing of the receiver are carried out on the basis of the optimal correlation peak, whereby the inter-symbol interference can be suppressed and the degradation of the code error rate can also be suppressed.

In addition, even when the state of the transmission path fluctuates in the operation of the mobile transmission or the like and hence the cross-correlation peak value fluctuates in the receiver, the processing of synchronizing the reception sampling clock frequency can be executed on the basis of the stable effective correlation peak. Thus, the reception sampling clock frequency can be always synchronized with the transmission sampling clock frequency at all times to continue to supply stably the reception sampling clock.

An OFDM data transmission apparatus according to another aspect of the present invention includes a receiver for carrying out an arithmetic operation of the correlation between an OFDM signal containing therein at least one of a principle wave and a reflected wave received and a predetermined synchronous symbol signal, out of one or more correlation peaks contained in a cross-correlation value sequence signal acquired from the arithmetic operation of the correlation, detecting an effective correlation peak brought by the principle wave, and on the basis of the effective correlation peak thus detected, carrying out the the reception sampling clock synchronous processing and the control for the frame timing and the symbol timing of the receiver.

In the operation of the OFDM data transmission in which the reflected wave having a delay time longer than the guard interval and having a high level can substantially be assumed to be absent, there exist no such reflected wave which when synchronization is made therewith, would provide a less inter-symbol interference. Therefore, by setting the FFT time window on the basis of the correlation peak brought by the principle wave, the inter-symbol interference can be either removed or substantially disregarded.

In this connection, as for technologies associated with the OFDM transmission, reference may be made to U.S. Ser. No. 09/096454, Seiichi Sano et al. filed on Jun. 11, 1998 entitled "DATA TRANSMISSION APPARATUS AND RECEIVING APPARATUS USING ORTHOGONAL FREQUENCY DIVISION MULTIPLEX MODULATION SYSTEM" and U.S. Ser. No. 09/203564, Seiichi Sano et al. filed on Dec. 2, 1998 entitled "SYNCHRONIZATION DETECTION METHOD FOR DATA TRANSMISSION APPARATUS AND DATA TRANSMISSION APPARATUS USING THE SAME". The disclosures of these prior applications are hereby incorporated by reference herein.

BRIEF DESCRIPTION OF THE DRAWINGS

The foregoing and other objects and advantages of the invention will be apparent from the following more particular description of the preferred embodiments of the invention as illustrated in the accompanying drawings wherein.

DESCRIPTION OF THE EMBODIMENTS

Figure 1:
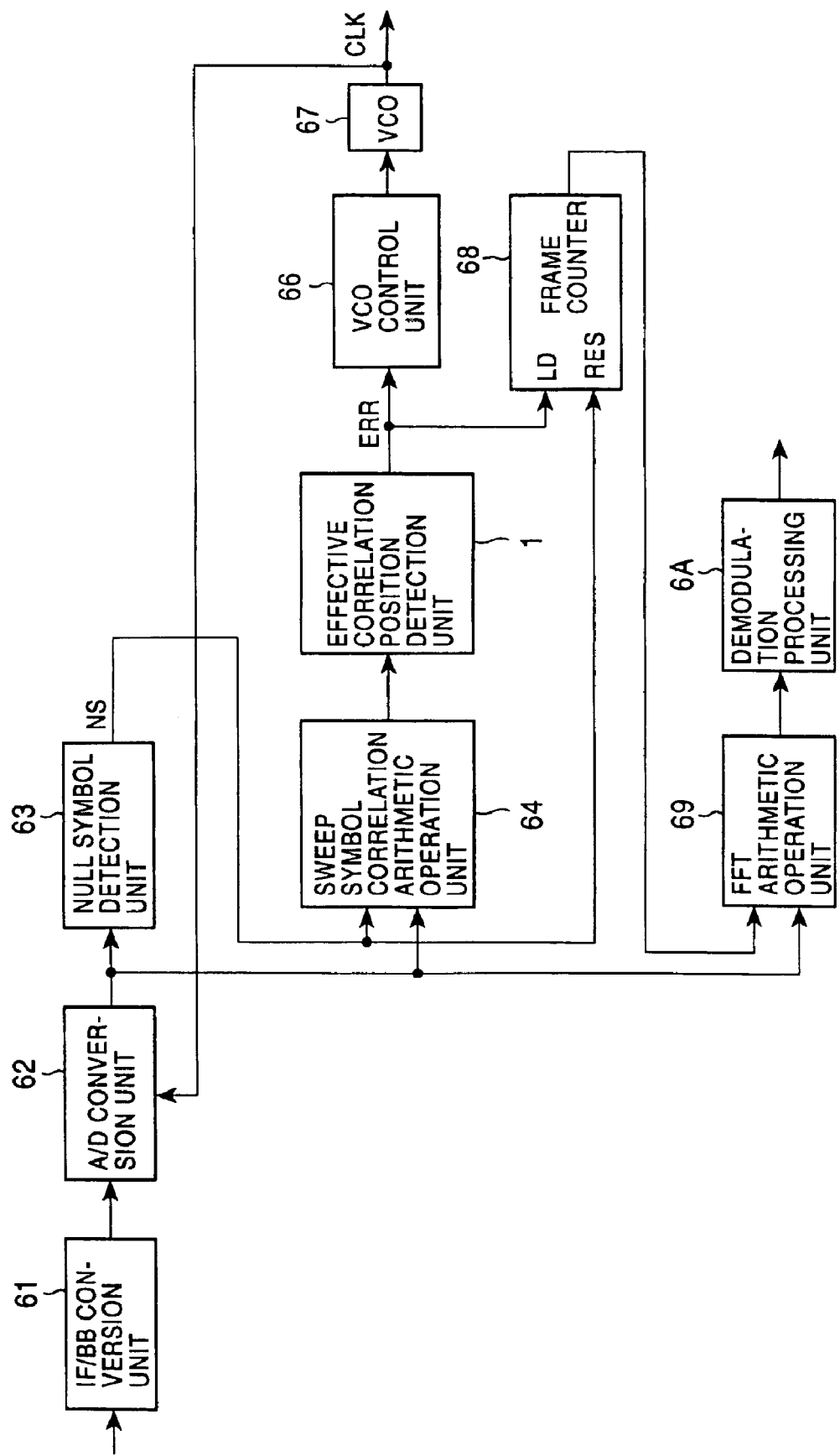
FIG. 1 is a block diagram showing a configuration of an embodiment of a receiver according to the present invention.
Figure 2:
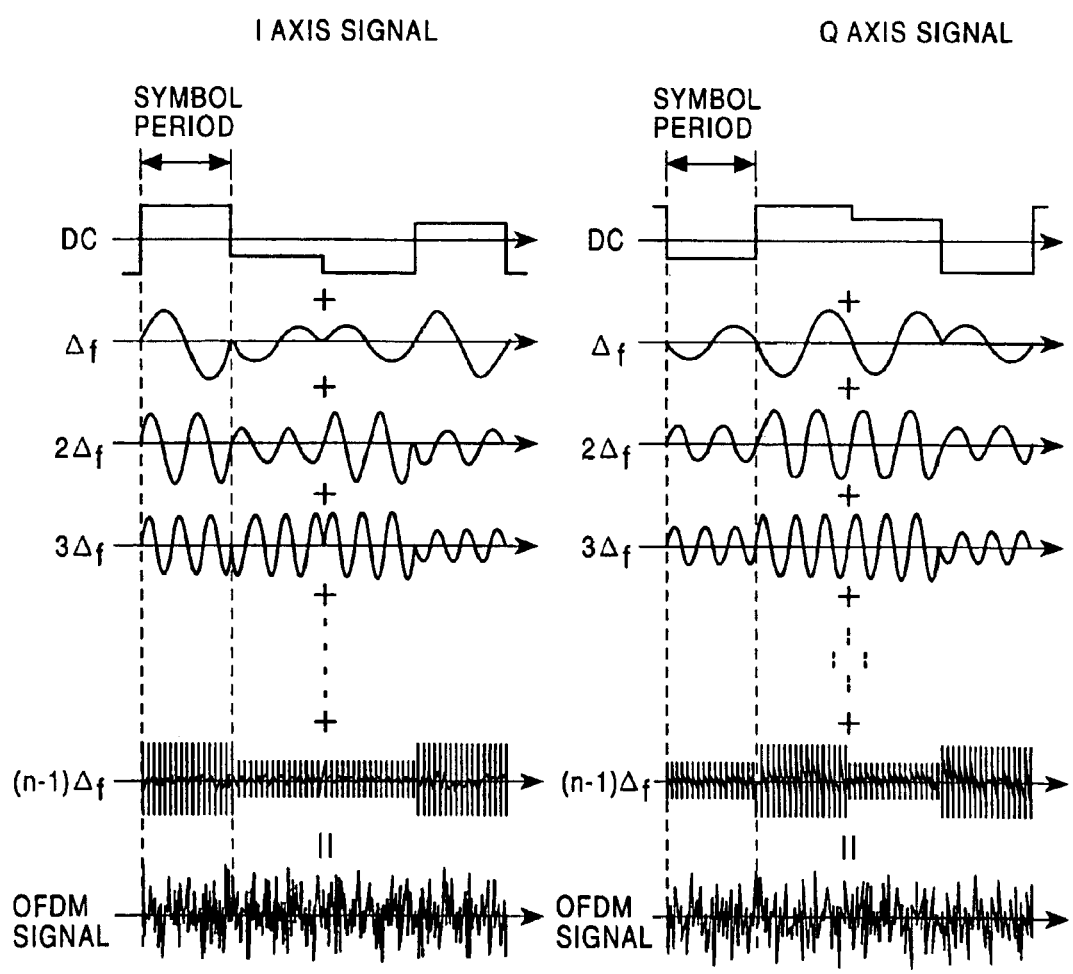
FIG. 2 is a wave form chart useful in explaining one example of an OFDM modulated signal.
Figure 3:
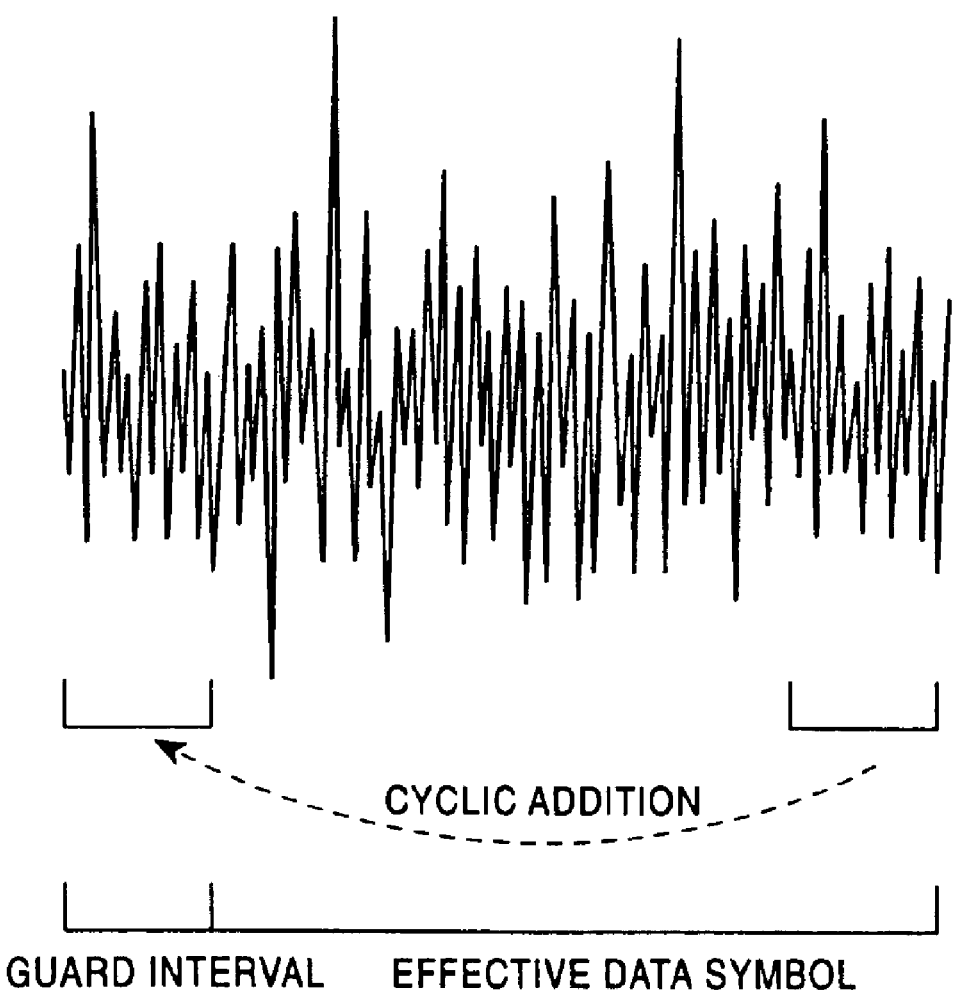
FIG. 3 is a wave form chart useful in explaining one example of an OFDM symbol.
Figure 4:
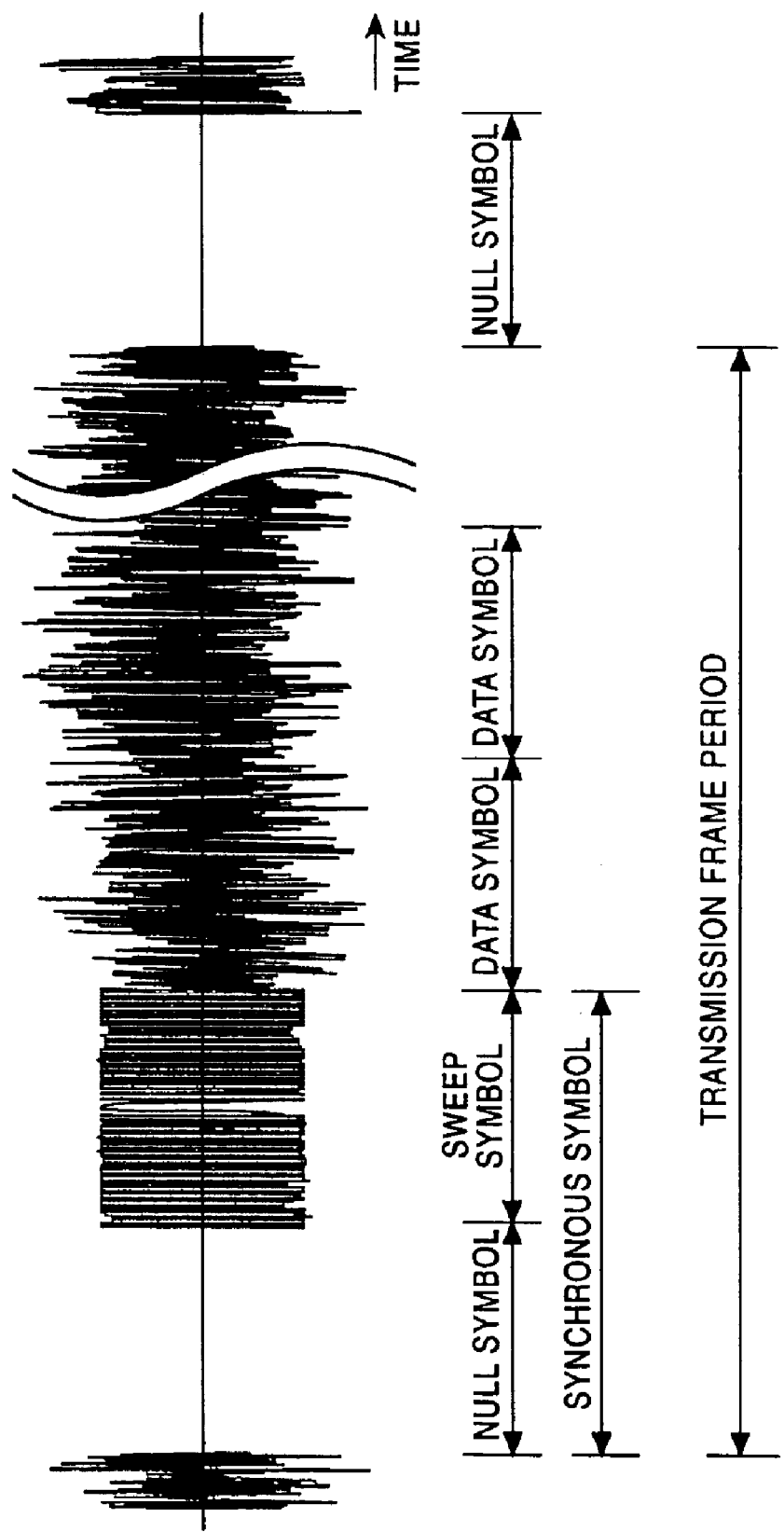
FIG. 4 is a wave form chart useful in explaining the structure of a transmission frame of the OFDM modulated signal.

A digital transmission according to an embodiment of the present invention will hereinafter be described in detail with reference to the accompanying drawings. In this connection, in the figures, the same parts are designated with the same reference numerals.

FIG. 1 is a block diagram showing a configuration of a receiver of a digital transmission apparatus according to one embodiment of the present invention.

Figure 5:
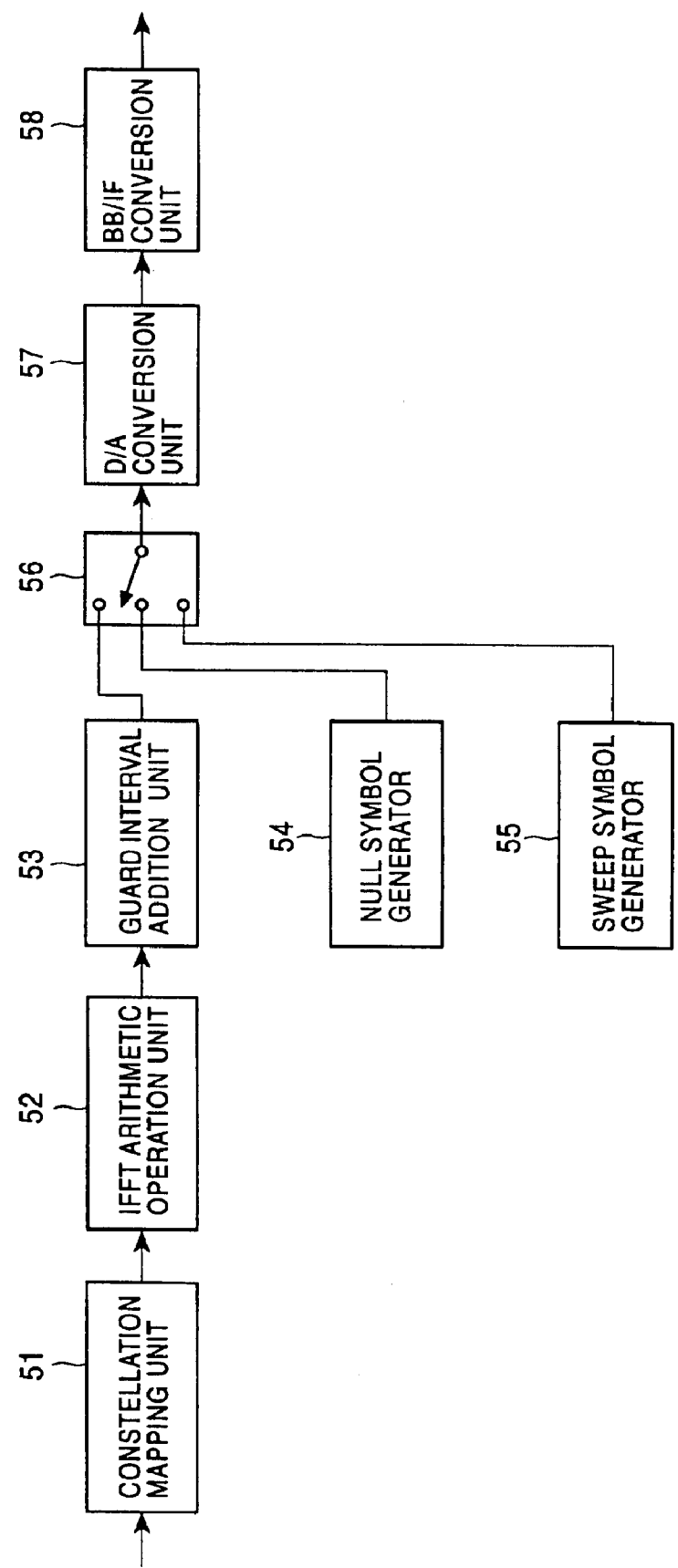
FIG. 5 is a block diagram showing a configuration of a transmitter of one example in an OFDM transmission apparatus.
Figure 6:
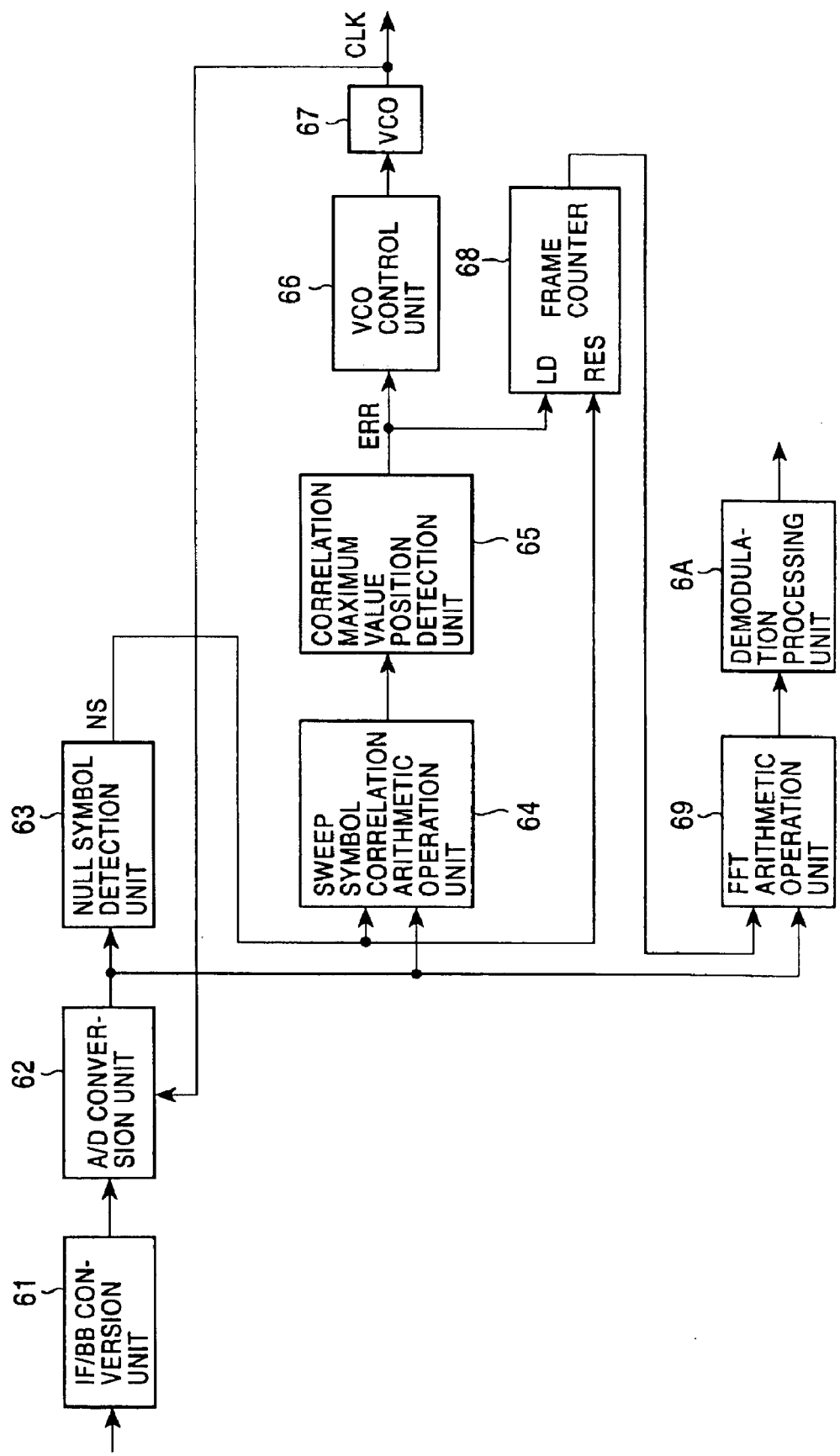
FIG. 6 is a block diagram showing a configuration of a receiver of one example in the OFDM transmission apparatus.

In FIG. 1, a received signal transmitted from a transmitter like one shown in FIG. 5 to reach the receiver through a transmission path is first converted from a signal having a inter frequency (IF) band to a signal having a base band frequency band in an IF/BB conversion unit 61, as described with reference to FIG. 6.

An output signal from the IF/BB conversion unit 61 is subjected to the analog/digital conversion in an A/D conversion unit 62 using a reception sampling clock. A reception sample value sequence signal acquired from the A/D conversion unit 62 is inputted to a null symbol detection unit 63, a sweep symbol correlation arithmetic operation unit 64 and an FFT arithmetic operation unit 69. The null symbol detection unit 63 detects a null symbol from the reception sample value sequence signal to detect roughly a starting point of a frame. An output signal NS from the null symbol detection unit 63 is inputted to the sweep symbol correlation arithmetic operation unit 64 and then the arithmetic operation of the cross-correlation between the reception sample value sequence signal and a sweep symbol which is previously set is carried out in timing with the frame starting signal NS to acquire a cross-correlation value sequence.

Description will hereinbelow be given with respect to the operation of the receiver including an effective correlation position detection unit 1 according to the present invention.

Figure 15:
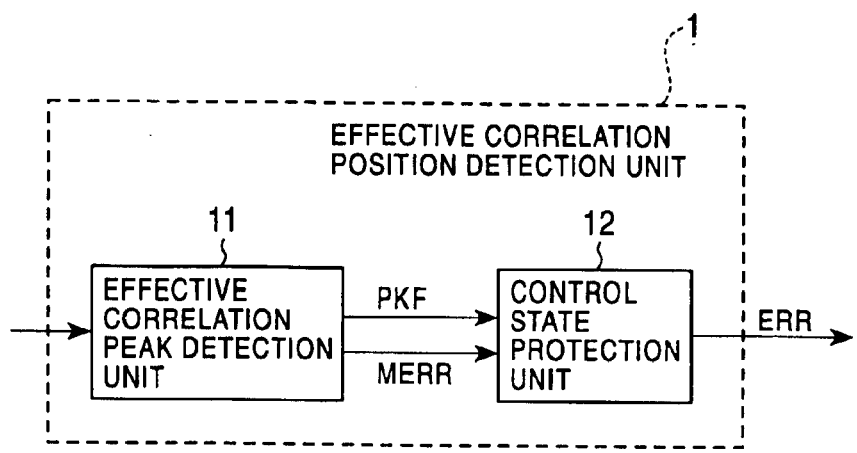
FIG. 15 is a block diagram showing an example of a configuration of an effective correlation position detection unit 1 of the embodiment shown in FIG. 1 of the present invention.
Figure 16:
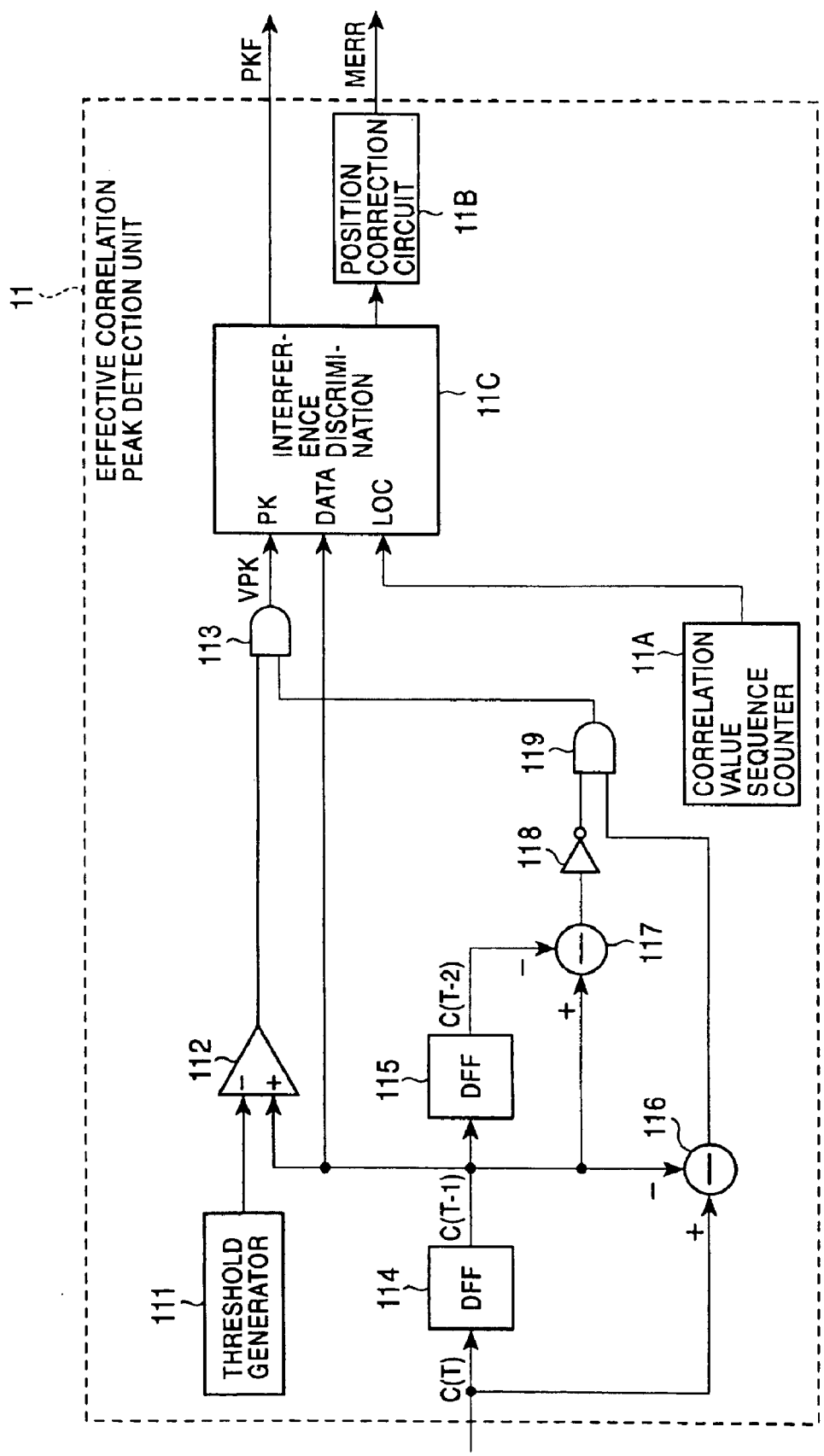
FIG. 16 is a block diagram showing an example of a configuration of an effective correlation peak detection unit 11 of the embodiment shown in FIG. 1 of the present invention.

FIG. 15 is a block diagram showing a configuration of the effective correlation position detection unit 1. The effective correlation position detection unit 1 is constituted by an effective correlation peak detection unit 11 and a control state protection unit 12. In addition, the detailed configuration of the effective correlation peak detection unit 11 is shown in FIG. 16.

Figure 7:
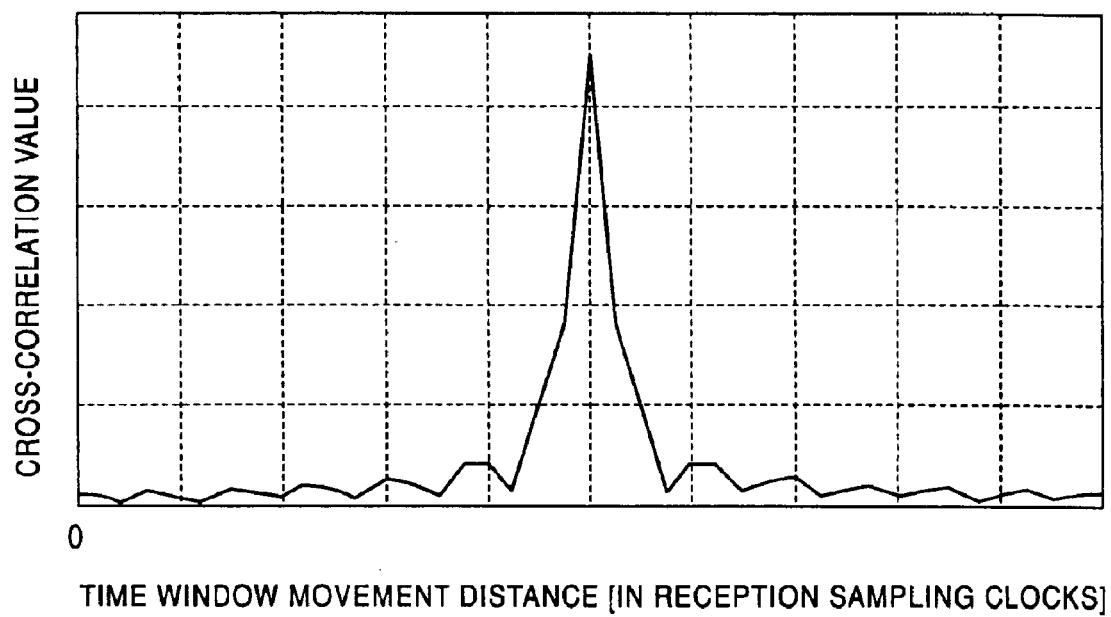
FIG. 7 is a graphical representation showing one example of the state of a cross-correlation value sequence signal.
Figure 8:
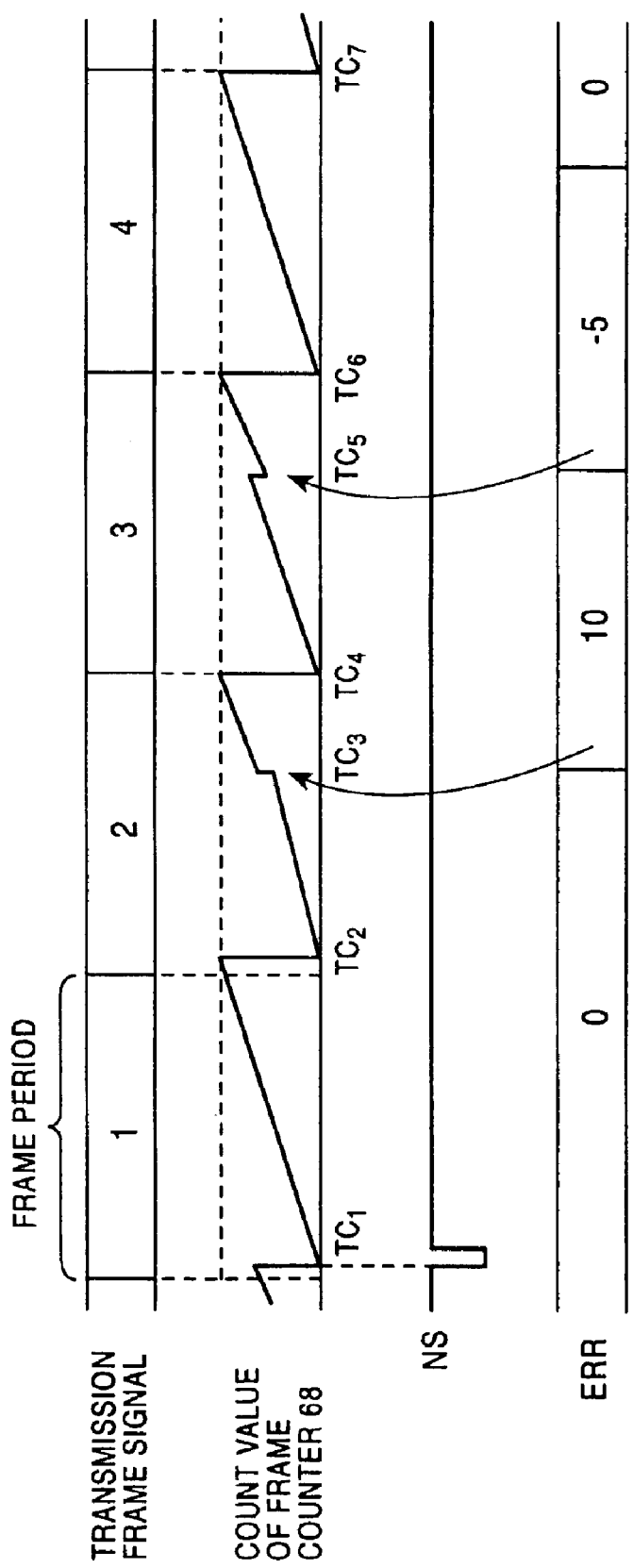
FIG. 8 is a time chart useful in explaining the operation of a frame counter 68 shown in FIG. 6.
Figure 9:
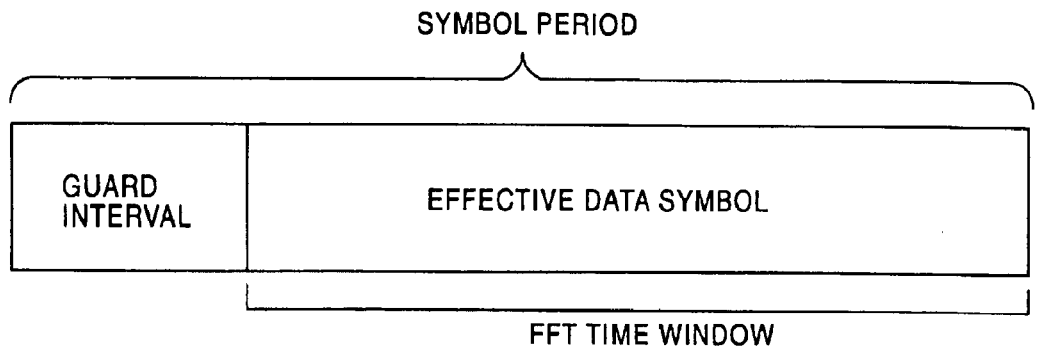
FIG. 9 is a schematic diagram useful in explaining a time window of an FFT arithmetic operation unit 69.
Figure 10:
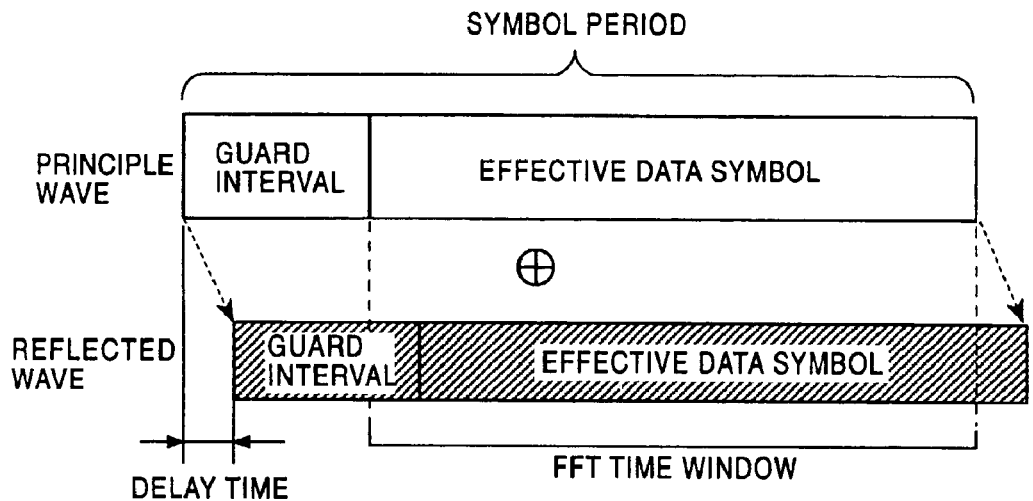
FIG. 10 is a schematic diagram useful in explaining the situation of mixing of a reflected wave within a guard interval period of time.
Figure 11:
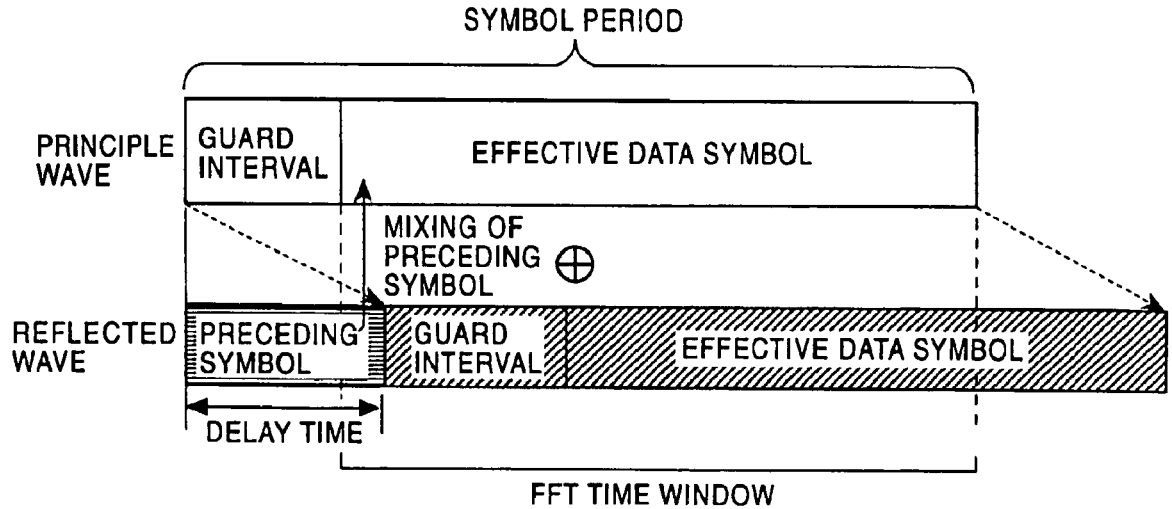
FIG. 11 is a schematic diagram useful in explaining the situation of mixing of a reflected wave out of a guard interval period of time.
Figure 12:
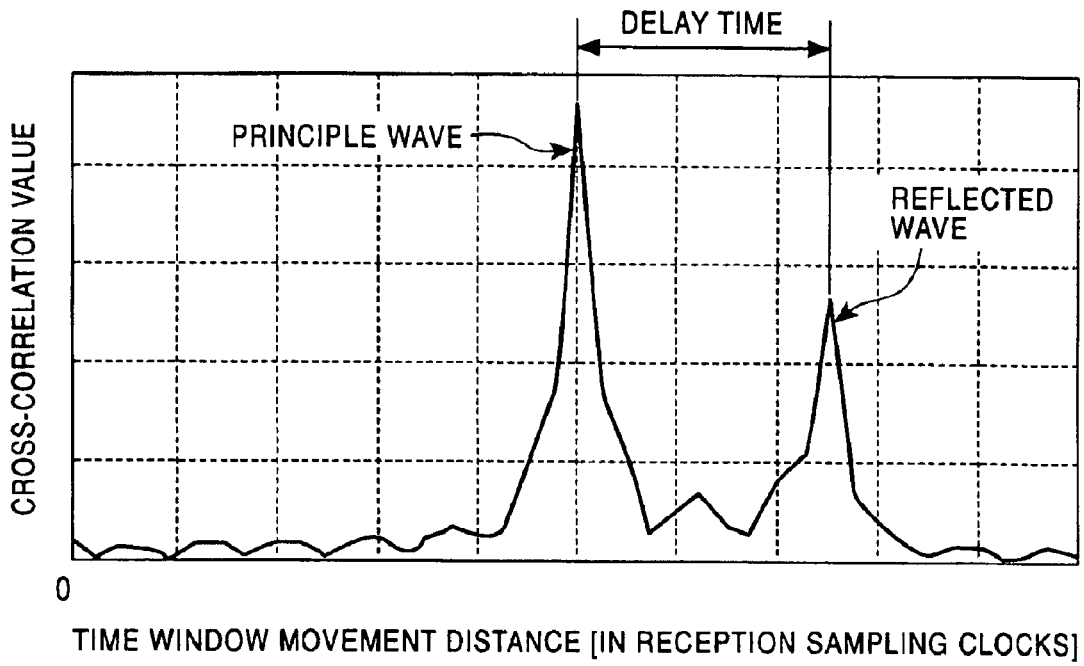
FIG. 12 is a graphical representation showing the state of a cross-correlation value sequence signal when a principle wave is mixed with a reflected wave (having a low level)
Figure 13:
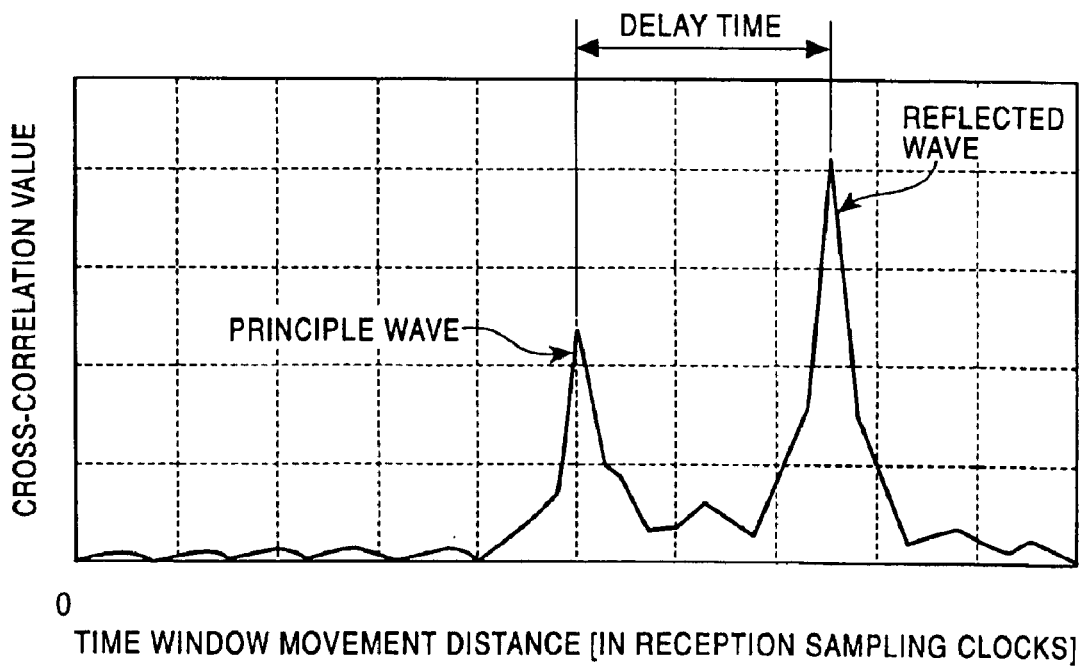
FIG. 13 is a graphical representation showing the state of a cross-correlation value sequence signal when a principle wave is mixed with a reflected wave (having a high level)
Figure 14:
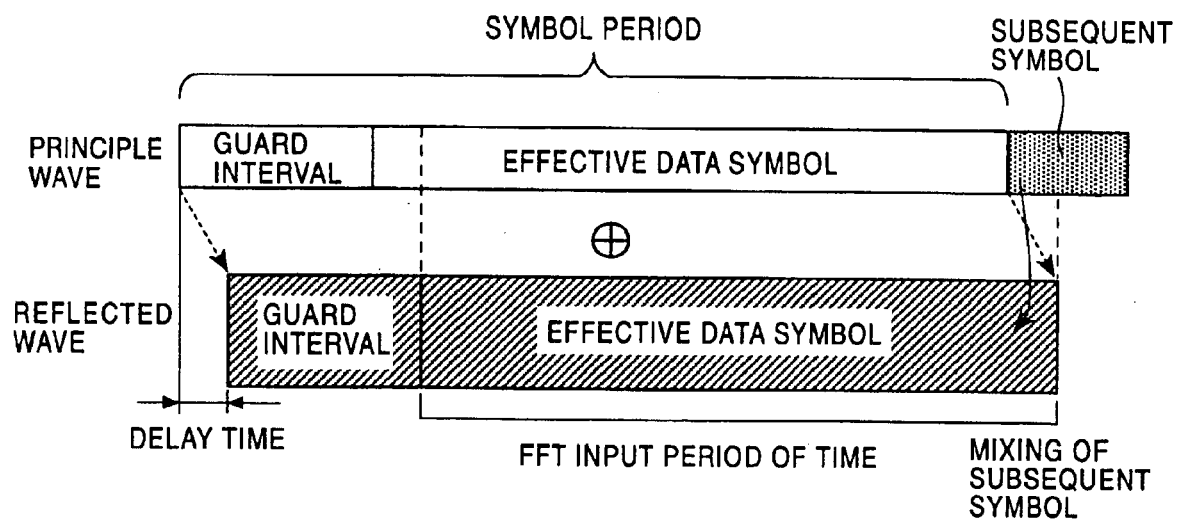
FIG. 14 is a schematic diagram useful in explaining an FFT time window when synchronized with a reflected wave.
Figure 17:
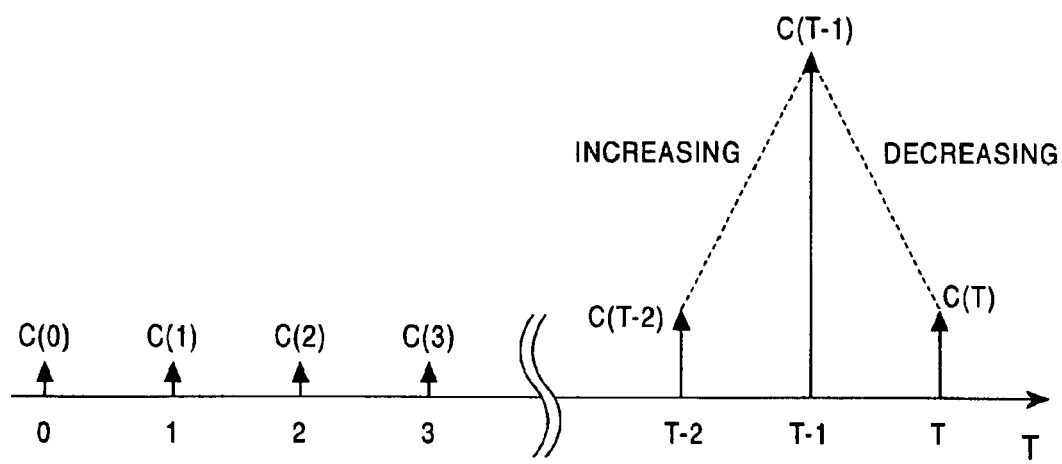
FIG. 17 is a schematic diagram useful in explaining a cross-correlation value sequence C(T)

A cross-correlation value sequence signal as an output signal from the sweep symbol correlation arithmetic operation unit 64 is inputted to a DFF (a D-type flip-flop) 114 an output signal of which is in turn inputted to a DFF 115. Now, if the cross-correlation value sequence signal as shown in FIGS. 7, 12 and 13, and the like, as shown in FIG. 17, is defined as C(T) (but, T is a sample number and is one of natural numbers), then the input signal to the DFF 114, the input signal to the DFF 115 and the output signal from the DFF 115 can be expressed in the form of C(T), C(T−1) and C(T−2), respectively.

As described above, by the principle wave in the received signal is meant the signal which reaches earliest the receiver. Thus, the correlation peak at the earliest time point, out of the correlation peaks, in the cross-correlation value sequence C(T), i.e., at a time point when T is smallest is the correlation peak brought by the principle wave, and also the correlation peak following that correlation peak is brought by the reflected wave.

The fact that the peaks are present in the cross-correlation value sequence C(T) means that if the differential coefficient (dC(T)/dT) of C(T) is increased as T is increased, and after the maximum value of the peaks, the differential coefficient of C(T) has a tendency to be decreased, then it follows that the peak is present, and the maximum value of the peak at that time is given as the peak value.

If this fact is expressed in the form of the sample value sequence, since the differential coefficient is expressed by {C(n)−C(n−1)}(n: natural numbers), when the following relations are established, $C(T-1)-C(T-2)>0$ (a differential coefficient has a tendency to be increased) . . . (1) and $C(T)-C(T-1)<0$ (a differential coefficient has a tendency to be decreased) . . . (2) it can be said that the peak is present in the cross-correlation value sequence signal, and also the peak value at this time is C(T−1).

Describing the above-mentioned expression (1) on the basis of the configuration of the effective correlation peak detection unit 11, C(T−2) as the output signal from the DFF 115 is subtracted from C(T−1) as the output signal from the DFF 114 in a subtracter 117.

The subtracter 117 carries out the subtraction of C(T−1)−C(T−2) to output the most significant code bit of the subtraction result in order to show whether the result of the arithmetic operation is a positive number or a negative number. When the subtraction is carried out using the 2s complement, if the code bit is 0, then it is shown that the subtraction result is a positive number, while if the code bit is 1, then it is shown that the subtraction result is a negative number.

In addition, likewise, describing the above-mentioned expression (2) on the basis of the configuration of the effective correlation peak detection unit 11, C(T−1) as the output signal from the DFF 114 is subtracted from C(T) as the input signal to the DFF 114 in a subtracter 116. This subtracter 116 carries out the subtraction of C(T)−C(T−1) to output similarly the code bit exhibiting whether the result of the arithmetic operation is positive or negative.

Now, since the presence of the peak is acquired when the expressions (1) and (2) are both established at the same time, it is established when the subtraction result of the subtracter 117 is a positive number, i.e., the logical value of the output from the subtracter 117 is 0, and also the subtraction result of the subtracter us a negative number, i.e., the logical value of the output from the subtracter 116 is 1.

Next, an output signal from the subtracter 117 is inputted to an inverter 118 in which the logic of the signal is in turn inverted to be inputted to one input terminal of an AND circuit 119. An output signal from the subtracter 116 is inputted to the other input terminal of the AND circuit 119. Then, when the logical values of the two input signals are both 1s, i.e., the correlation peak is present, the AND circuit 119 outputs an output signal having a logical value of 1, and otherwise, outputs an output signal having a logical value of 0.

However, in the cross-correlation value sequence which is shown in FIGS. 7, 12 and 13, and the like, with respect to the correlation peaks which are detected on the basis of the above-mentioned processings, in parts as well in each of which the level of the wave form of the cross-correlation value sequence is small, a large number of correlation peaks are present. Those correlation peaks each having a low level are not the correlation peaks each of which is generated when the time window of the arithmetic operation of the cross-correlation coincides with the sweep symbol of the principle wave or the reflected wave, but are generated due to the noises.

Figure 18:
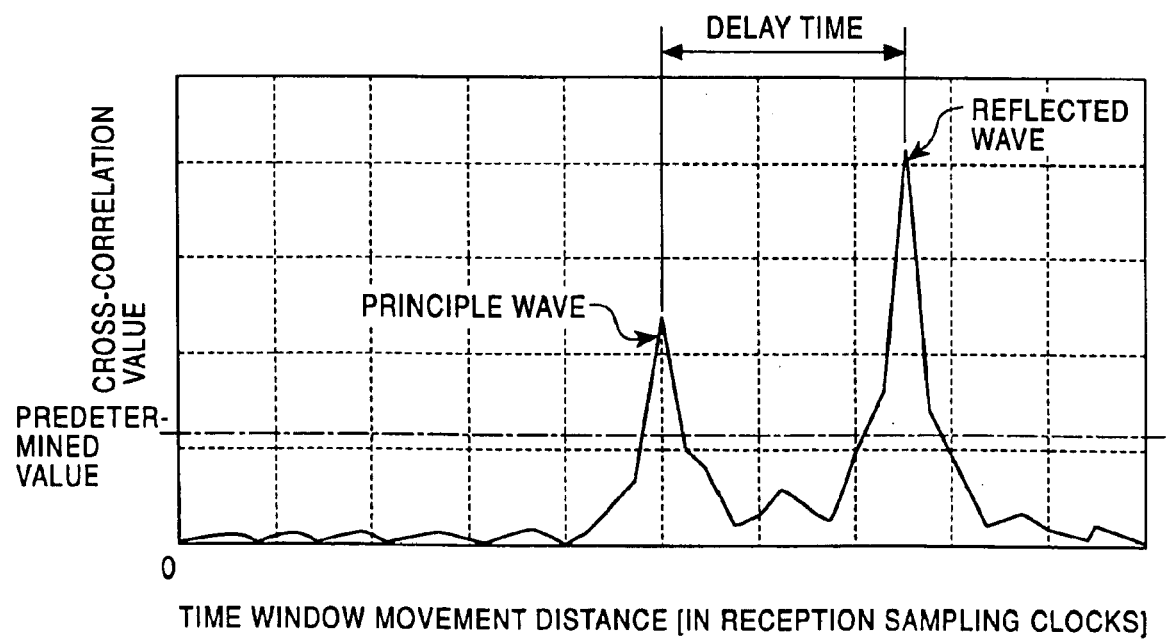
FIG. 18 is a graphical representation showing an example of a state of a cross-correlation value sequence signal.

Therefore, in order to remove any of the correlation peaks due to the noises, as shown in FIG. 18, a predetermined value is set in the cross-correlation value sequence and then the correlation peak is judged to be the effective correlation peak when the value of the correlation peak is equal to or larger than the predetermined value. In such a way, a plurality of effective correlation peaks brought by the principle wave or the reflected wave are detected from within the acquired cross-correlation value sequence.

Describing this operation, this predetermined value is outputted from a threshold generator 111. The predetermined value is either previously set to a fixed value or set to an arbitrary fraction of the level of the reception sample value sequence to make follow the level of the reception sample value sequence.

The output signal from the threshold generator 111 is inputted to a minus input terminal of a comparator 112. In addition, to a plus input terminal of the comparator 112 is inputted C(T−1) as the value of the correlation peak, i.e., an output signal from the DFF 114. The comparator 112 compares the magnitude of the output value of the DFF 114 with the magnitude of the output value from the threshold generator 111, and when the magnitude of the output value from the DFF 114 is larger than the magnitude of the output value from the threshold generator 111, outputs the logical value of 1 to show that the correlation peak of interest is the effective correlation peak.

With the arrangement, the effective correlation peak is acquired when both of the logical values of the output signal from the AND circuit 119 as the flag exhibiting that the correlation peak is present and the output signal from the comparator 112 as the flag exhibiting that the correlation peak has a predetermined level and hence is effective are both 1s.

Now, the output terminal of the AND circuit 119 is electrically connected to one input terminal of the AND circuit 113, and the output terminal of the comparator 112 is electrically connected to the other input terminal of the AND circuit 113. As a result, when both of the logical values of the two input signals to the AND circuit 113 are 1s, the AND circuit 113 outputs the logical value of 1 as a VPK signal, and when 1 is outputted therefrom, it is shown that there is the effective correlation peak.

In addition, in the above-mentioned correlation peak detection processings, a cross-correlation value sequence counter 11A counts a sample number T of the cross-correlation value sequence, and when the count values of the corresponding correlation peaks, i.e., a plurality of effective correlation peaks are present, outputs the respective sample number Ts.

Each of the above-mentioned VPK signals is inputted to a PK terminal of an interference discrimination unit 11C, and the output signal from the DFF 114 at that time, i.e., each of the corresponding correlation peak values is inputted to a DATA terminal of the interference discrimination unit 11C, and also the output signal from the correlation value sequence counter 11A at that time, i.e., each of the corresponding sample numbers is inputted to an LOC terminal of the interference discrimination unit 11C.

The interference discrimination unit 11C discriminates that, in order to obtain a less inter-symbol interference the FET time window should be provided in synchronism with which one of the principle wave or the reflected wave constituting the received signal, and choose the correlation peak in which the inter-symbol interference is least as the correlation peak for establishment of synchronization.

Figure 24:
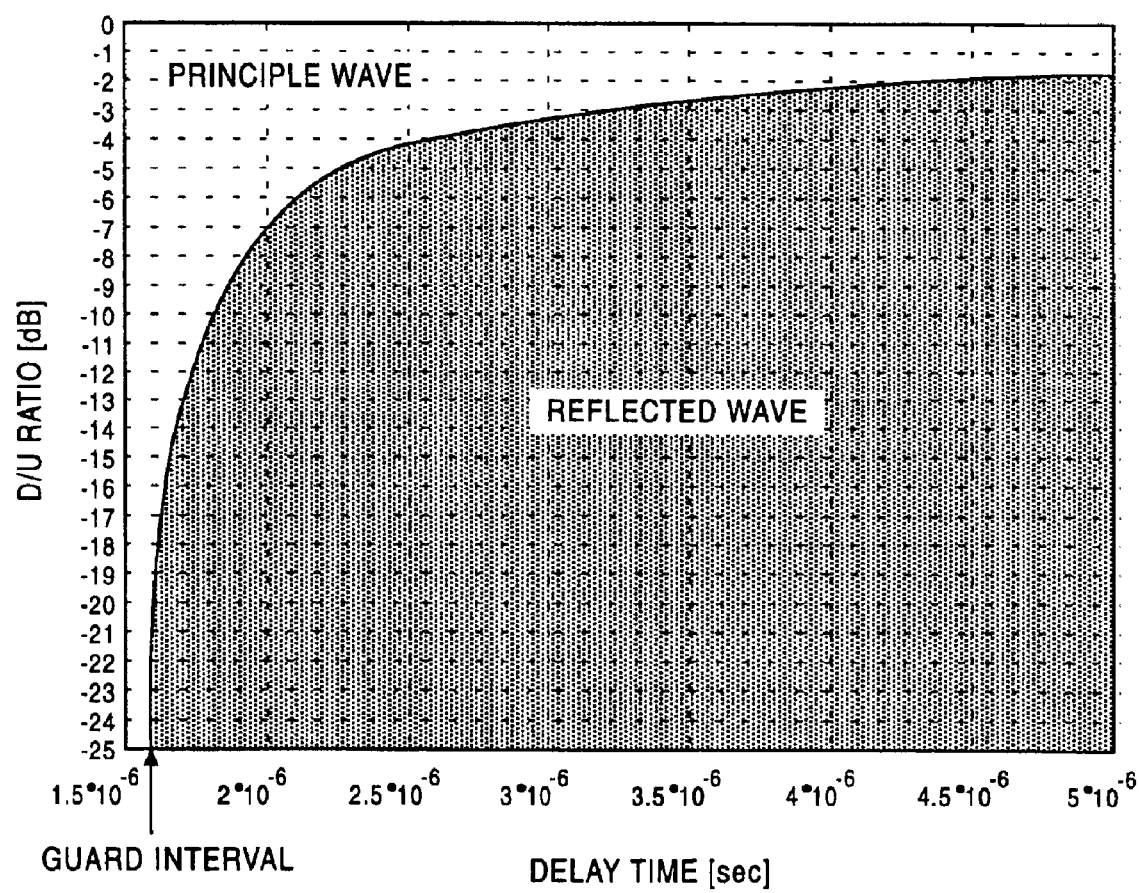
FIG. 24 is a graphical representation showing that does the inter-symbol interference become less when with which of a principle wave or a reflected wave the synchronization is made.

For example, as seen from FIG. 24, when the delay time of the reflected wave falls within the guard interval, the inter-symbol interference becomes less when the synchronizatin is made with the principle wave, no matter what the D/U ratio is. However, when a reflected wave is present the delay time of which exceeds the guard interval, it can be discriminated from FIG. 24 that it may be better to provide the FET time window in synchronism with which one of the principle wave or the reflected wave on the basis of the D/N ratio.

Next, the operation of the interference discrimination unit 11C will hereinbelow be described in detail.

The interference discrimination unit 11C judges that when the logical value at the PK terminal becomes 1 as described above, each of the correlation peak values at the DATA terminal and each of the sample number at the LOC terminal are valid, and stores those values in memory means such as a RAM (Random Access Memory) or an FF (Flip-Flop)(not shown). In other words, for example, in the case as shown in FIG. 18, the two effective correlation peak values brought by the principle wave and the reflected wave, respectively, and the corresponding sample numbers are all stored therein.

Then, the level difference (the D/U ratio) between the principle wave and the reflected wave is arithmetically operated on the basis of those effective correlation peak values. As for the method of operating arithmetically the D/N ratio, the division between the level of the principle wave and the level of the reflected wave is carried out, and the logarithmically arithmetic operation is carried out for the division result, whereby it is possible to operate arithmetically the D/U ratio. In addition, the sample number of the principle wave is subtracted from the sample number of the reflected wave to operate arithmetically the delay time in sampling clocks.

Thus, by using the relation between the arithmetically operated D/U ratio and the delay time shown in FIG. 24, it is judged that, in order to obtain a less inter-symbol interference the FET time window should be in synchronism with which one of the correlation peak of the principle wave or that of the reflected wave, and then on the basis of the judgement result, the correlation peak in which the inter-symbol interference is least is made the correlation peak for establishment of synchronization.

However, the arithmetic operation circuit for carrying out the arithmetic operation for the correlation peak values brought by the principle wave and the reflected wave, and the delay time to discriminate the condition shown in FIG. 24 requires a very large circuit scale. For this reason, the method is easier wherein it is previously arithmetically operated that does the inter-symbol interference become less when with which of the principle wave or the reflected wave the synchronization is made in correspondence to the correlation peak values brought by the principle wave and the reflected wave, and the delay time, and this arithmetic operation result is stored in memory means such as a RAM to carry out the discrimination.

As described above, the interference discrimination unit 11C discriminates that which one of the principle wave or the reflected wave the synchronization should be attained with.

However, in the actual transmission path, it does not occur frequently that the reflected wave, as shown in the oblique line part of FIG. 24, which has a long delay time and which has a high level is regularly present. In addition, when carrying out an OFDM system design, the design is in general carried out such that the delay time of the reflected wave due to the used frequency band and the transmission path environment does not exceed the guard interval. In such a manner, when it is assumed that the reflected wave is not present such that when the synchronization is made with the reflected wave, the inter-symbol interference becomes less, a large number of redundant circuits are included in the above-mentioned interference discrimination unit 11C.

For this reason, if out of a plurality of correlation peaks acquired in the interference discrimination unit 11C, the correlation peak having the smallest sample number was discriminated as the correlation peak brought by the principle wave, and the FFT time window was provided on the basis of that correlation peak, then the inter-symbol interference can be removed.

A circuit for realizing this is very simple in configuration. Thus, the smallest sample number may be detected out of a plurality of acquired sample numbers using a comparator or the like. This circuit has an advantage that the circuit configuration thereof can be remarkably simplified as compared with that of the interference discrimination unit 11C as described above.

In addition, the interference discrimination unit 11C outputs as a VLOC the sample number when the effective correlation peak is present and also outputs the logical value of 1 to a flag (PKF) exhibiting that the effective correlation peak is present.

On the other hand, when the effective peak is absent in the cross-correlation value sequence and hence the logical values of all of the VPK signals are 0s, the interference discrimination unit 11C similarly outputs the logical value of 0 as the PKF.

The VLOC signal which has been outputted from interference discrimination unit 11C and which exhibits the sample number of the effective correlation peak is inputted to a position correction circuit 11B.

The position correlation circuit 11B, from this VLOC signal, i.e., from the sweep symbol position for establishment of synchronization, arithmetically operates the frame starting timing to output an error signal MERR against the count value, of the frame starting timing, which has been counted in reception sampling clocks. Now, if the frame starting timing provided by the frame counter 68 coincides with the frame starting timing which is assumed from the sweep symbol position for establishment of synchronization, then the logical value of the error signal MERR becomes 0, while if the error occurs, then the information relating to the error amount in sampling clocks is outputted.

By executing the above-mentioned processings, the effective correlation peak detection unit 11 detects the correlation peak in the cross-correlation value sequence to discriminate the correlation peak in which the inter-symbol interference is least. If the correlation peak is present, then the effective correlation peak detection unit 11 outputs the error signal MERR exhibiting an error between the PKF signal as the flag exhibiting that the effective correlation peak is present and the count value of the frame counter 68.

Figure 19:
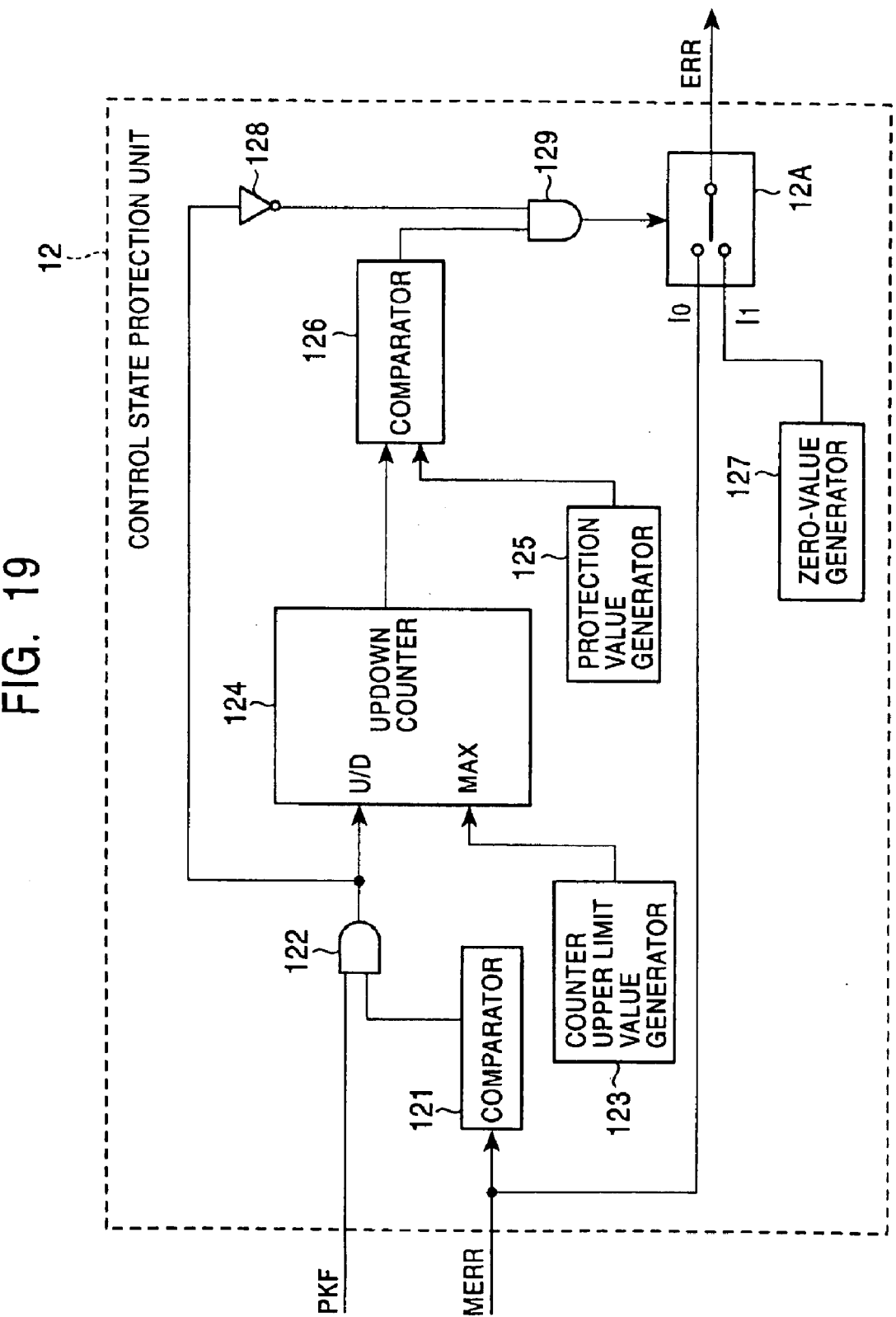
FIG. 19 is a block diagram showing an example of a configuration of a control state protection unit 12 of the embodiment shown in FIG. 1 of the present invention.

Next, a configuration of the control state protection unit 12 is shown in FIG. 19, and the operation thereof will hereinbelow be described.

As described above, in the operation in the mobile transmission, the fluctuation of the correlation peak values of the principle wave and the reflected wave in the cross-correlation value sequence may become violent, and then the fluctuation of the reception sampling clock frequency, and the fluctuation of the frame timing and the symbol timing may occur in some cases.

When the state of the transmission path is stable, the stable reception sampling clock is supplied to the receiver, both of the frame timing and the symbol timing are also stable, and the principle wave having a high level stably reach the receiver, the control state protection unit 12 operates in such a way that the effective correlation peak brought by the principle wave is made the correlation peak for establishment of synchronization in the receiver, and on the basis of this effective correlation peak, the control for the reception sampling clock frequency, and the control for the frame timing and the symbol timing are carried out.

On the other hand, when the state of the transmission path is of very poor quality and hence the stable principle wave does not reach the receiver, the control state protection unit 12 has the function of suspending the above-mentioned control in the receiver and carrying out the demodulation while maintaining the state experienced when the principle wave stably reaches the receiver.

This operation of the control state protection unit 12 will hereinbelow be described in detail with reference to a timing chart shown in FIG. 21.

When the synchronization is unestablished, the error information MERR outputted from the effective correlation peak detection unit 11 fluctuates largely, and hence the control for the reception sampling clock frequency and the control for the frame timing and the symbol timing are carried out.

Thereafter, when the synchronization is established and the state of the transmission path also becomes stable, the fluctuation of the error information MERR becomes less (e.g., the fluctuation amount falls within ±1).

A comparator 121, when the inputted error information MERR falls within a predetermined range (e.g., ±1), exhibits the stable reception state to output the logical value of 1.

Figure 20:
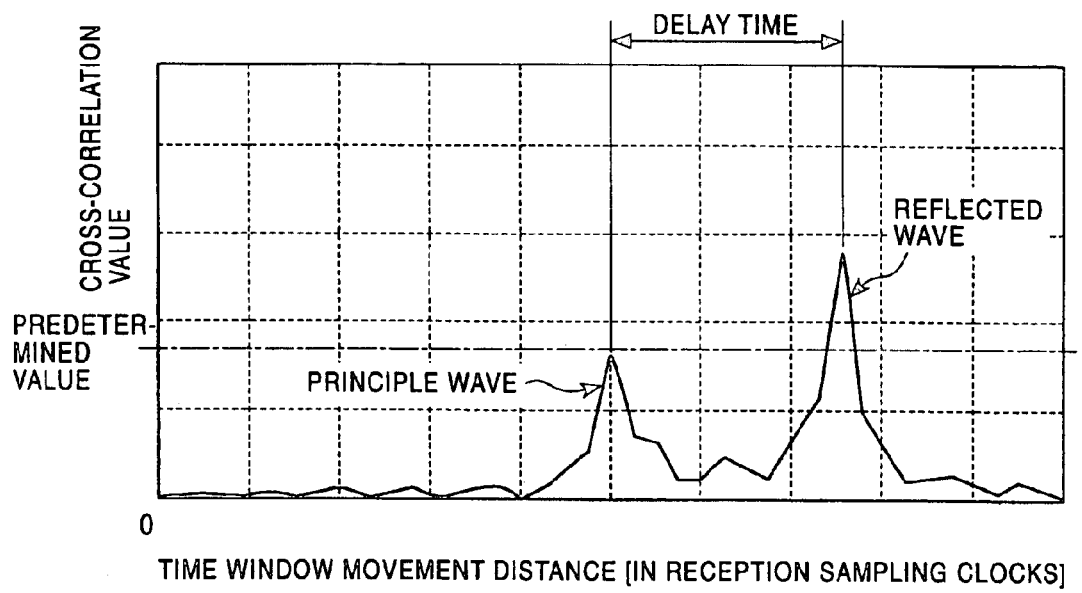
FIG. 20 is a graphical representation showing a state of a cross-correlation value sequence signal in which a correlation peak brought by a principle weave does not exceed a predetermined value.

However, when the state of the transmission path which has been stable till now fluctuates to bring the cross-correlation value sequence as shown in FIG. 20, and the correlation peak value of the principle wave in the comparator 112 shown in FIG. 16 becomes smaller than a level of the threshold generator 111, the fluctuation of the error information MERR becomes abruptly large, and also the value of the error information MERR exceeds a predetermined range (e.g., ±1). At this time, the comparator 121 exhibits that the state of the transmission path fluctuates and becomes unstable to output the logical value of 0.

In addition, PKF as the flag exhibiting that the effective correlation peak is present is inputted to one input terminal of an AND circuit 122. An output signal from the comparator 121 is inputted to the other input terminal of the AND circuit 122. When the two conditions are established that PKF is 1, i.e., the effective correlation peak is present, and the logical value of the output signal of the comparator 121 is 1, i.e., the state of the transmission path is stable, the AND circuit 122 outputs the logical value of 1.

An output signal from the AND circuit 122 is inputted to a U/D terminal of the updown counter 124. The updown counter 124 up-counts the count value when the logical value of the signal at the U/D terminal is 1, while down-counts the count value when the logical value of the signal at the U/D terminal is 0.

After the updown counter 124 counts the count value up to the value outputted from a counter upper limit value generator 123 (in FIG. 21, an output value thereof is set to 10 for example), it holds the count value for a period of time ranging from that time point (t1) to a time point when the logical value of 0 is inputted to the U/D terminal.

In such a manner, the fact that the count value is held at the value in the counter upper limit value generator 123 means that the state of the transmission path is within a period of time from t1 to t2 when it is regularly stable.

An output signal from the updown counter 124 is inputted to one input terminal of a comparator 126, and an output terminal of a protection value generator 125 is electrically connected to the other input terminal of the comparator 126.

The comparator 126 compares the magnitude of an output signal from the updown counter 124 with the magnitude of a predetermined value which is set in the protection value generator 125, and outputs the logical value of 1 when the value of the updown counter 124 is larger than the value of the protection value generator 125, while outputs the logical value of 0 when the value of the updown counter 124 is smaller than the value of the protection value generator 125.

Figure 21:
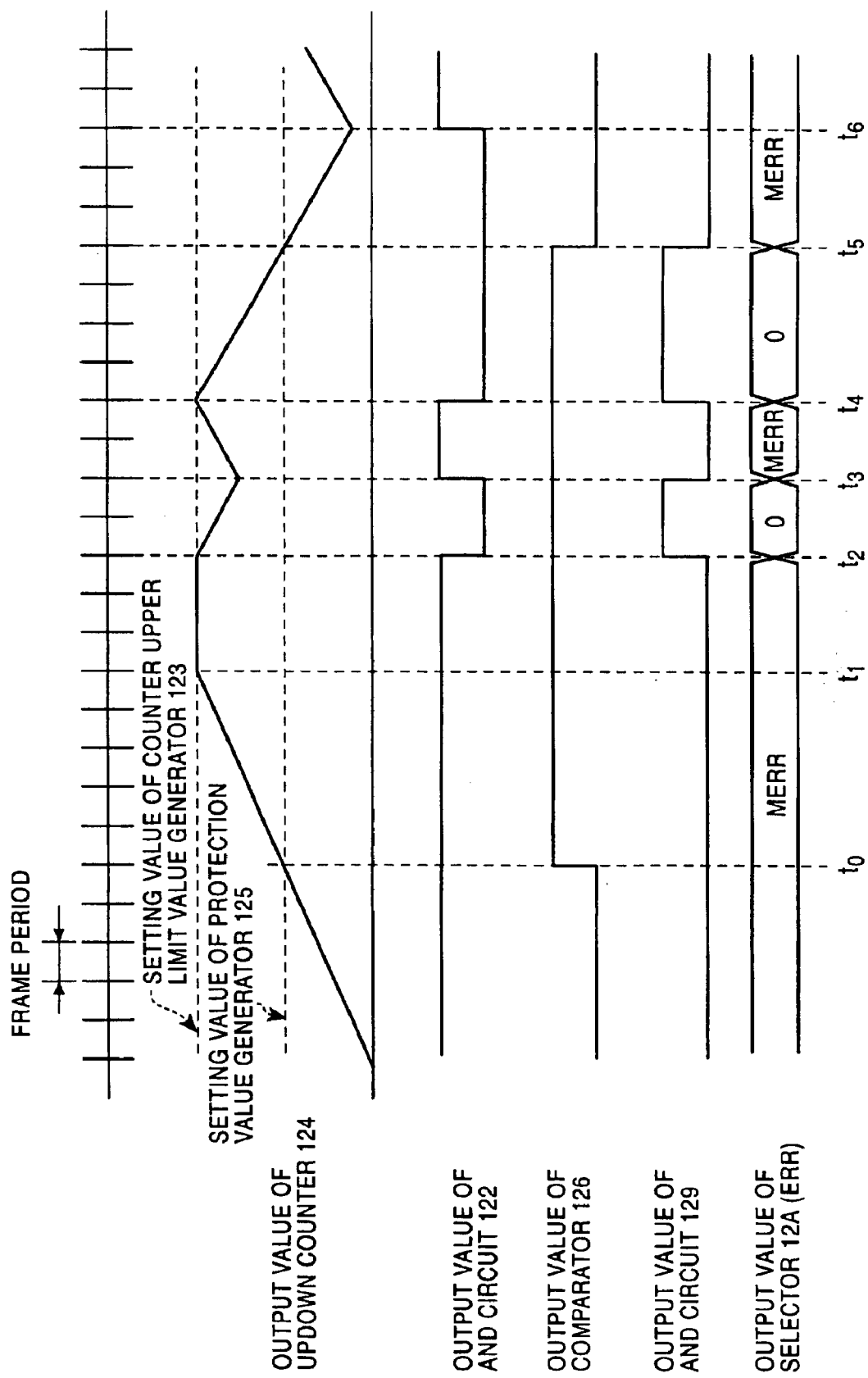
FIG. 21 is a timing chart useful in explaining the operation of the control state protection unit 12 of the embodiment shown in FIG. 1 of the present invention.
Figure 22:
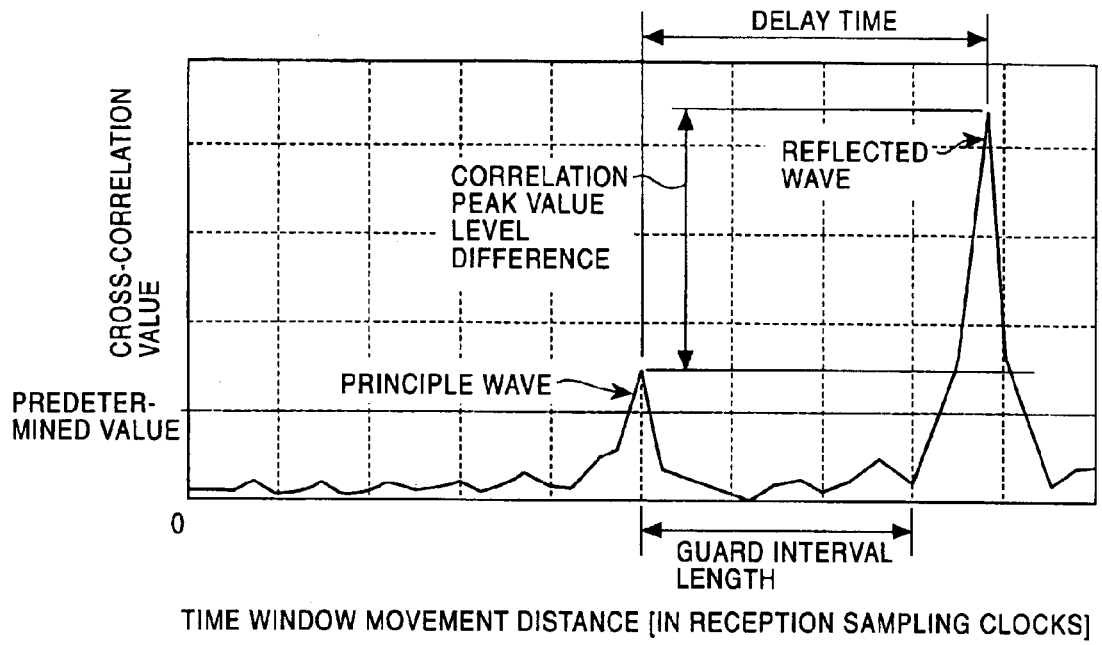
FIG. 22 is a graphical representation showing an example of a state of the cross-correlation value sequence signal.
Figure 23:
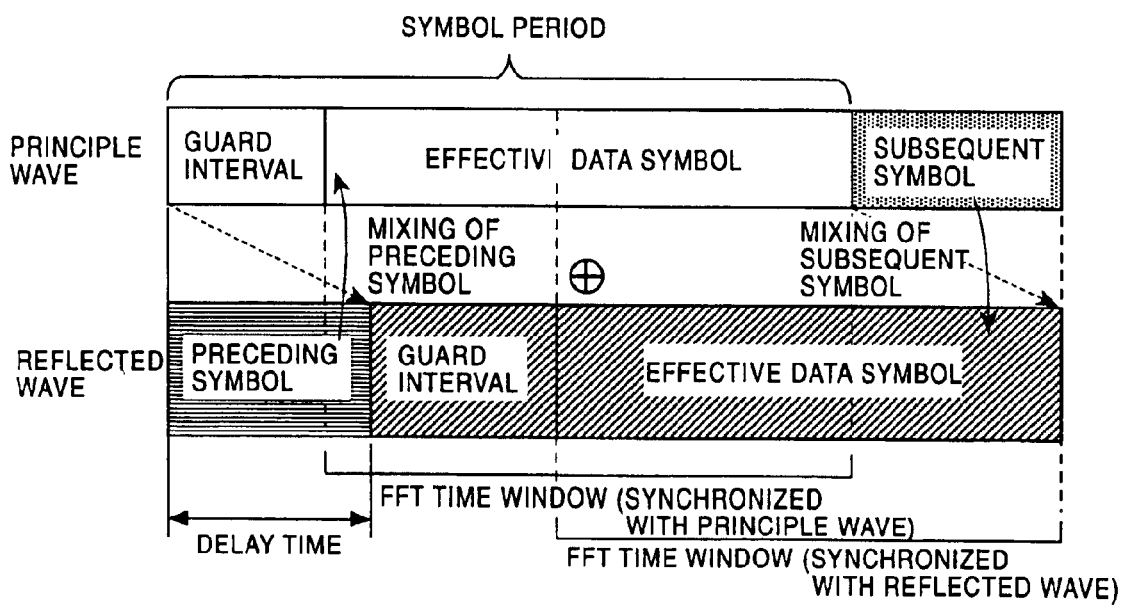
FIG. 23 is a schematic diagram representing an FFT time window when a principle wave is mixed with a reflected wave.

In addition, the value of the protection value generator 125 is previously set to a value smaller than that of the counter upper limit generator 123 (in the case of FIG. 21, it is set to 5 for example).

When the state of the transmission path is in the stable state as for a period of time from t1 to t2, since the count value of the updown counter 124 is larger than that of the protection value generator 125, the comparator 126 outputs the logical value of 1.

The output signal from the comparator 126 is inputted to one input terminal of the AND circuit 129, and the signal which has been acquired by inverting the logic of the output signal from the AND circuit 122 in an inverter 128 is inputted to the other input terminal of the AND circuit 129.

Therefore, since for a stable period of time from t0 to t2, the logical value of the output signal from the AND circuit 122 is 1, the logic of the input signal to the AND circuit 129 is inverted in the inverter 128 to be 0, and hence the logical values of the two input signals to the AND circuit 129 become 1 and 0, respectively, so that the logical value of the output signal from the AND circuit 129 becomes 0.

An output terminal of the AND circuit 129 is electrically connected to a switching terminal of a selector 12A. Then, the selector 12A, when the logical value of the signal at the switching terminal is 0, outputs a signal at an I0 terminal as the error information signal ERR and when the logical value of the signal at the switching terminal is 1, outputs a signal at an I1 terminal.

Therefore, since for a period of time from t0 to t2, the logical value of the input signal at the switching terminal is 0, the selector 12A outputs as it is the signal at the I0 terminal, i.e., the error signal MERR as the error information ERR to apply the error information ERR to the VCO control unit 66 to control the VCO 67 in such a way that the reception sampling clock frequency is synchronized with the sampling clock frequency on the transmission side.

However, when the state of the transmission path fluctuates from the regularly stable state to the unstable state in an instant (for a period of time from t2 to t3), the logical value of the output signal from the AND circuit 122 exhibiting the state of the transmission path becomes 0, and hence the updown counter 124 starts to carry out the down-count. However, in this case, since the count value of the updown counter 124 is larger than the value of the protection value generator 125, the comparator 126 outputs the logical value of 1.

Then, in this case, since the logical value of the output signal from the AND circuit 122 becomes 0 to be inverted in the inverter 128, the logical value of the input signal to the other input terminal of the AND circuit 129 becomes 1, and hence the AND circuit 129 outputs the logical value of 1.

As a result, on the basis of the output signal having the logical value of 1 from the AND circuit 129, the terminal of the selector 12A is switched over to the I1 terminal side so that the selector 12A outputs as the error information signal ERR an output signal having the logical value of 0 from a zero-value generator 127 in accordance with which the logical value of the error information signal ERR which is used to control the VCO 67 is made 0.

At the time when the logical value of the error information ERR becomes 0, the VCO control unit 66, on the assumption that the reception sampling clock frequency error is absent, holds the frequency-controlled voltage of the VCO 67 at the current value.

In such a manner, when the situation of the transmission path fluctuates in an instant from the regularly stable state to the unstable state, the demodulation operation is carried out while holding the control state exhibited when the reception has been stably carried out.

Then, for a period of time from t3 to t4 when the state of the transmission path is stable, the same processing as that for a period of time from t0 to t2 is executed to output as the error information the signal MERR as it is.

Next, description will hereinbelow be given with respect to the case where the state of the transmission path becomes continuously unstable as for a period of time from t4 to t6.

First, for a period of time from t4 to t5 when the output value from the updown counter 124 is larger than the value of the protection value generator 125 and hence the comparator 126 outputs the logical value of 1, the same processing as that for a period of time from t2 to t3 is executed, and the logical value of the error information signal ERR is made 0 to hold the current control state.

However, at the time when the magnitude of the output signal from the updown counter 124 becomes smaller than the value of the protection value generator 125 (at a time t5), the logical value of the output signal from the comparator 126 becomes 0, and the logical value of the AND circuit 129 also becomes 0.

Therefore, during a period of time from t5 to t6, the terminal of the selector 12A is switched over to the I0 terminal side, and hence the selector 12A outputs as the error information ERR the inputted signal MERR as it is.

That is, for this operation, when the situation of the transmission path becomes continuously unstable for a longer period of time than the value (a period of time) which is set in the protection value generator 125, since the possibility that the state of the control for the receiver is not synchronized with the transmission side is high, the control for the reception sampling clock frequency, and the control for the frame timing and the symbol timing are both carried out again.

While in the receiver according to the present invention as has been described above, both of the frame timing and the symbol timing are controlled on the basis of the correlation peak for establishment of synchronization, the function of the present invention may also be attained in such a way that only the FFT time window is shifted in the direction of the time base while stabilizing the control for the frame timing and the symbol timing.

In addition, while in the above-mentioned embodiment, the sweep symbol is employed as the synchronous symbol which is used to carry out the cross-correlation arithmetic operation, it is to be understood that even if the sweep symbol is replaced with any of other suitable signals, the present invention may also be implemented.

For example, as the method of modulating the data symbol, there is known the differential wave detection method wherein the phase difference between the signal of interest and the signal one symbol before the signal of interest is detected, and the demodulation is carried out in accordance with the phase difference. When the differential wave detection method is employed, the reference signal exhibiting the initial phase reference thereof is required, and this reference signal is referred to as the reference symbol.

With respect to the reference symbol, the random phase reference signals are provided for all of the carriers, respectively, those signals are subjected to the IFFT processing similarly to the data symbol to add the guard interval thereto. The reference symbol is arranged as the synchronous symbol in the synchronous symbol group of the frame heads. Since it is general that the reference symbol employs the same signal every frame, the wave form of the reference symbol can be previously acquired by using a computer or the like. In such a manner, the arithmetic operation of the cross-correlation between the known reference symbol and the received signal sequence is carried out, whereby similarly to the sweep symbol, the control for the FFT time window position and the control for the VCO frequency can also be carried out.

As set forth hereinabove, in the receiver according to the above-mentioned embodiment, even in the case where the state of the transmission path is of very poor quality and hence the composite signal of the principle wave and the reflected wave is received as the received signal, and also the level of the reflected wave becomes larger than that of the principle wave, the control for the frame timing and the symbol timing, i.e., the control for the time window of the FFT arithmetic operation is carried out in such a way that the inter-symbol interference becomes minimum, whereby it is possible to suppress the degradation of the code error rate.

In addition, in the case where the state of the transmission path fluctuates in the operation of the mobile transmission or the like and hence the correlation peak value in the receiver fluctuates, when the state of the transmission path is of very poor quality, and hence the stable principle wave does not yet reach the receiver, the control for the reception sampling clock frequency is suspended to hold the state obtained when the stable reception is carried out, whereby it is possible to continue to supply stably the reception sampling clock.

While the invention has been particularly described and shown with reference to the preferred embodiments thereof, it will be understood by those skilled in the art that various changes in form and detail and omission may be made therein without departing from the scope of the invention.

What is claimed is:

1. A data transmission apparatus for transmitting an orthogonal frequency division multiplexed (OFDM) signal, in which a null symbol and a synchronous symbol are included, comprising:

a transmitter for transmitting an OFDM signal; and a receiver for receiving the OFDM signal, said receiver including:

an A/D conversion unit, to which said OFDM signal is applied, for converting said OFDM signal to a reception sample value sequence signal;

a null symbol detection unit for detecting a position of said null symbol from said reception sample value sequence signal;

a correlation arithmetic operation unit for carrying out an arithmetic operation of the correlation in order to detect a cross-correlation value between said reception sample value sequence signal containing at least a principle wave and a reflected wave which have been received and a predetermined synchronous symbol signal in a predetermined time window provided in accordance with said position of said null symbol, and obtaining cross-correlation peaks in said principle wave and said reflected wave in a comparison of said cross-correlation value with a predetermined value;

an interference discrimination unit coupled with said correlation arithmetic operation unit, for detecting which peak is a less inter-symbol interference in said cross-correlation peaks obtained from said principle wave and said reflected wave;

an effective correlation position detection unit for detecting a position of said detected cross-correlation peak from said interference discrimination unit;

a clock generator for generating a sampling clock, said sampling clock being compensated on the bases of the position of said cross-correlation peak from said effective correlation position detection unit, and said compensated sampling clock is applied to said A/D conversion unit; and a demodulation processing unit for demodulating said reception sample value sequence signal from said A/D conversion unit.

2. A data transmission apparatus according to claim 1, wherein said receiver further includes a control state protection unit, which comprises a comparator and a protection value generator for generating a predetermined protection value, said comparator comparing said cross-correlation value with said predetermined protection value, so that the compensation of said sampling clock is suspended on the basis of the compared result between said cross-correlation value and said predetermined protection value.

3. A data transmission apparatus according to claim 1, wherein said clock generator comprising:

a frame counter for counting the frame timing with the sampling clock from the received OFDM signal;

a position correction circuit for compensating said sampling clock on the bases of the position of said cross-correlation peak from said effective correlation position detection unit; and a voltage-controlled oscillator, an oscillation frequency signal of which is controlled by said position correction circuit to generate the sampling clock.

4. A data transmission apparatus according to claim 1, wherein said interference discrimination unit detects one of said cross-correlation peaks obtained from said principle wave and said reflected wave on the bases of a delay time and a correlation peak value level difference between said cross-correlation peaks obtained from said principle wave and said reflected wave.

5. A data transmission apparatus according to claim 1, wherein said receiver further includes an FFT arithmetic operation unit coupled with said A/D conversion unit, and the position of an FFT time window of said FFT arithmetic operation unit is set on the basis of said cross-correlation peak.

6. A receiver for receiving an orthogonal frequency division multiplexed (OFDM) signal, in which a null symbol and a synchronous symbol are included, comprising:

an A/D conversion unit, to which said OFDM signal is applied, for converting said OFDM signal to a reception sample value sequence signal;

a null symbol detection unit for detecting a position of said null symbol from said reception sample value sequence signal;

a correlation arithmetic operation unit for carrying out an arithmetic operation of the correlation in order to detect a cross-correlation value between said reception sample value sequence signal containing at least a principle wave and a reflected wave which have been received and a predetermined synchronous symbol signal in a predetermined time window provided in accordance with said position of said null symbol, and obtaining cross-correlation peaks in said principle wave and said reflected wave in a comparison said cross-correlation value with a predetermined value;

an interference discrimination unit coupled with said correlation arithmetic operation unit, for detecting which peak is a less inter-symbol interference in said cross-correlation peaks obtained from said principle wave and said reflected wave;

an effective correlation position detection unit for detecting a position of said detected cross-correlation peak from said interference discrimination unit;

a clock generator for generating a sampling clock, said sampling clock being compensated on the bases of the position of said cross-correlation peak from said effective correlation position detection unit, and said compensated sampling clock is applied to said A/D conversion unit; and a demodulation processing unit for demodulating said reception sample value sequence signal from said A/D conversion unit.

7. A receiver according to claim 6, further comprising a control state protection unit, which comprises a comparator and a protection value generator for generating a predetermined protection value, said comparator comparing said cross-correlation value with said predetermined protection value, so that the compensation of said sampling clock is suspended on the basis of the compared result between said cross-correlation value and said predetermined protection value.

8. A receiver according to claim 6, wherein said clock generator comprising:

a frame counter for counting the frame timing with the sampling clock from the received OFDM signal;

a position correction circuit for compensating said sampling clock on the bases of the position of said cross-correlation peak from said effective correlation position detection unit; and a voltage-controlled oscillator, an oscillation frequency signal of which is controlled by said position correction circuit to generate the sampling clock.

9. A receiver according to claim 6, wherein said interference discrimination unit detects one of said cross-correlation peaks obtained from said principle wave and said reflected wave on the bases of a delay time and a correlation peak value level difference between said cross-correlation peaks obtained from said principle wave and said reflected wave.

10. A receiver according to claim 6, further comprising an FFT arithmetic operation unit coupled with said an A/D conversion unit, and the position of an FFT time window of said FFT arithmetic operation unit is set on the basis of said cross-correlation peak.

11. A reception method for receiving an orthogonal frequency division multiplexed (OFDM) signal, in which a null symbol and a synchronous symbol are included, comprising the steps of:

converting said OFDM signal to a reception sample value sequence signal in an A/D conversion unit, to which said OFDM signal is applied;

detecting a position of said null symbol from said reception sample value sequence signal in a null symbol detection unit;

carrying out an arithmetic operation of the correlation in order to detect a cross-correlation value between said reception sample value sequence signal containing at least a principle wave and a reflected wave received and a predetermined synchronous symbol signal in a predetermined time window provided in accordance with said position of said null symbol, and obtaining cross-correlation peaks in said principle wave and said reflected wave in a comparison said cross-correlation value with a predetermined value in a correlation arithmetic operation unit;

detecting which peak is a less inter-symbol interference in said cross-correlation peaks obtained from said principle wave and said reflected wave in an interference discrimination unit coupled with said correlation arithmetic operation unit;

detecting a position of said detected cross-correlation peak from said interference discrimination unit in an effective correlation position detection unit;

generating a sampling clock in a clock generator, said sampling clock being compensated on the bases of the position of said cross-correlation peak from said effective correlation position detection unit, and said compensated sampling clock is applied to said A/D conversion unit; and demodulating said reception sample value sequence signal from said A/D conversion unit in a demodulation processing unit.

12. A reception method according to claim 11, further comprising the steps of, generating a predetermined protection value, comparing said cross-correlation value with said predetermined protection value, and suspending the compensation of said sampling clock on the basis of the compared result between said cross-correlation value and said predetermined protection value.

13. A reception method according to claim 11, wherein in said step of detecting which peak is a less inter-symbol interference includes the step of detecting one of said cross-correlation peaks obtained from said principle wave and said reflective wave on the bases of a delay time and a cross correlation peak value level difference between cross-correlation peaks obtained from said principle wave and said reflected wave.

* * * * *